US012461515B2

(12) United States Patent
Okuno

(10) Patent No.: US 12,461,515 B2
(45) Date of Patent: Nov. 4, 2025

(54) INFORMATION PROCESSING DEVICE, MACHINE TOOL, AND PROGRAM FOR REMOVING MACHINED SUBSTANCES

(71) Applicant: DMG MORI CO., LTD., Nara (JP)

(72) Inventor: Junichiro Okuno, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 456 days.

(21) Appl. No.: 17/976,896

(22) Filed: Oct. 31, 2022

(65) Prior Publication Data
US 2023/0049354 A1 Feb. 16, 2023

Related U.S. Application Data

(63) Continuation of application No. PCT/JP2021/029129, filed on Aug. 5, 2021.

(30) Foreign Application Priority Data

Aug. 6, 2020 (JP) .................................. 2020-133506

(51) Int. Cl.
*G05B 19/43* (2006.01)
*G06F 3/0482* (2013.01)
(Continued)

(52) U.S. Cl.
CPC .......... *G05B 19/43* (2013.01); *G06F 3/0482* (2013.01); *G06F 3/04847* (2013.01); *G06V 10/22* (2022.01); *G05B 2219/49348* (2013.01)

(58) Field of Classification Search
CPC ................. G06V 10/22; G05B 19/43; G05B 2219/49348; G05B 2219/37588;
(Continued)

(56) References Cited

U.S. PATENT DOCUMENTS 10,307,876 B2  6/2019  Okuda
10,895,952 B2 * 1/2021  Hong ...................... G06T 17/10
(Continued)

FOREIGN PATENT DOCUMENTS

JP   2007-114742 A   5/2007
JP   2008-155324 A   7/2008
(Continued)

OTHER PUBLICATIONS

International Search Report issued for the prior international application No. PCT/JP2021/029129 mailed on Sep. 14, 2021.

*Primary Examiner* — Rami R Okasha
(74) *Attorney, Agent, or Firm* — IP Business Solutions, LLC

(57) ABSTRACT

An information processing device includes: a mesh setting unit that sets a plurality of mesh zones in a captured image including a scattering range of a substance scattered during machining by a machine tool; an accepting unit that accepts a selection of one or more mesh zones corresponding to an area for removing the substance from the plurality of mesh zones; a substance recognition unit that recognizes a substance state in the mesh zones corresponding to the area with respect to the captured image; and a display instruction unit that instructs display of indicators based on the substance state recognized in the area in time series.

8 Claims, 19 Drawing Sheets

(51) Int. Cl.
*G06F 3/04847* (2022.01)
*G06V 10/22* (2022.01)

(58) Field of Classification Search
CPC .............. G05B 19/401; B23Q 11/005; B23Q 17/2409; B23Q 17/2433; B23Q 17/249; Y02P 70/10
See application file for complete search history.

(56) References Cited

U.S. PATENT DOCUMENTS

| | | | |
|---|---|---|---|
| 2007/0064101 A1 | 3/2007 | Hasegawa et al. | |
| 2009/0082979 A1* | 3/2009 | Sato | G01R 31/2831 702/59 |
| 2011/0319711 A1 | 12/2011 | Yamaguchi et al. | |
| 2013/0229516 A1* | 9/2013 | Jones | G01N 21/359 348/143 |
| 2015/0334371 A1* | 11/2015 | Galera | G06V 20/56 348/46 |
| 2016/0184945 A1 | 6/2016 | Saitou | |
| 2016/0184947 A1* | 6/2016 | Itou | B23Q 11/0046 15/319 |
| 2016/0263745 A1* | 9/2016 | Shirahata | B25J 11/00 |
| 2017/0043442 A1* | 2/2017 | Takikawa | B05B 15/60 |
| 2017/0144262 A1 | 5/2017 | Okuda | |
| 2017/0165803 A1* | 6/2017 | Nakayama | G06F 18/22 |
| 2017/0190011 A1 | 7/2017 | Kurosumi | |
| 2018/0250783 A1 | 9/2018 | Inaba et al. | |
| 2019/0196439 A1* | 6/2019 | Sugita | G05B 19/19 |
| 2019/0196454 A1 | 6/2019 | Tarui | |
| 2020/0356068 A1* | 11/2020 | O'Hare | G05B 19/409 |
| 2021/0142458 A1* | 5/2021 | Miyawaki | G06V 10/56 |
| 2022/0220697 A1* | 7/2022 | Sharp | E02F 9/24 |

FOREIGN PATENT DOCUMENTS

| | | |
|---|---|---|
| JP | 2010-035756 A | 2/2010 |
| JP | 2012-010733 A | 1/2012 |
| JP | 2016-120589 A | 7/2016 |
| JP | 2017-094420 A | 6/2017 |
| JP | 2018-024094 A | 2/2018 |
| JP | 2019-111637 A | 7/2019 |
| JP | 2019-117477 A | 7/2019 |

* cited by examiner

FIG. 7

| IMAGING TIME | | 1 | 2 | 3 | 4 | 5 | 6 | 7 | ... |
|---|---|---|---|---|---|---|---|---|---|
| IMAGE ID | | I1 | I2 | I3 | I4 | I5 | I6 | I7 | ... |
| TIME POINT OF IMAGING | | T1 | T2 | T3 | T4 | T5 | T6 | T7 | ... |
| ZONE ID | ... | ... | ... | ... | ... | ... | ... | ... | ... |
| | A5-15 | 0 | 0 | 0 | 0 | 1 | 0 | 0 | ... |
| | A5-16 | 0 | 0 | 1 | 1 | 2 | 0 | 0 | ... |
| | A5-17 | 0 | 0 | 0 | 0 | 1 | 0 | 0 | ... |
| | ... | ... | ... | ... | ... | ... | ... | ... | ... |
| | A6-14 | 0 | 0 | 0 | 0 | 1 | 0 | 0 | ... |
| | A6-15 | 1 | 1 | 1 | 2 | 2 | 1 | 1 | ... |
| | A6-16 | 1 | 1 | 2 | 2 | 2 | 1 | 1 | ... |
| | ... | ... | ... | ... | ... | ... | ... | ... | ... |
| INDICATOR FOR WHOLE SUBSTANCE REMOVAL AREA | | 20 | 22 | 26 | 31 | 60 | 24 | 24 | ... |

INFORMATION PROCESSING DEVICE, MACHINE TOOL, AND PROGRAM FOR REMOVING MACHINED SUBSTANCES

BACKGROUND OF INVENTION

1. Field

The present invention relates to an information processing device, a machine tool, and a program.

2. Description of Related Art

Machining a workpiece with a machine tool will generate chips. A large amount of accumulated chips makes it difficult to continue the processing. Therefore, in a machine tool, it is necessary to remove chips generated in machining. Patent Literature 1 discloses a technique for cleaning a machine tool when the total length of machining time or the number of machining processes for a workpiece reaches a predetermined value. Patent Literatures 2 and 3 disclose a technique in which a robot cleans a portion determined to be necessary to remove chips by detecting accumulation of the chips inside a machine tool.

RELATED ART LIST

Patent Literature 1: JP 2008-155324 A
Patent Literature 2: JP 2016-120589 A
Patent Literature 3: JP 2019-111637 A However, even when the machining time is short or the number of machining processes is small, chips may accumulate in some places. Further, in the case of small accumulation amount, if the removal operation is not performed because of the small accumulation amount and the chips remain accumulated for a long time, the chips may solidify and become difficult to remove.

SUMMARY

The present invention provides a device or the like described in the claims.

The present disclosure can also provide a machine tool and an information processing system.

These general and specific aspects may be implemented by a system, a method, and a computer program as well as a combination thereof.

According to the present invention, it is possible to easily grasp the state of accumulation of chips generated in a machine tool.

BRIEF DESCRIPTION OF DRAWINGS

FIG. 7 is a data structure diagram indicating history data generated by the information processing device;

DETAILED DESCRIPTION

Figure 1:
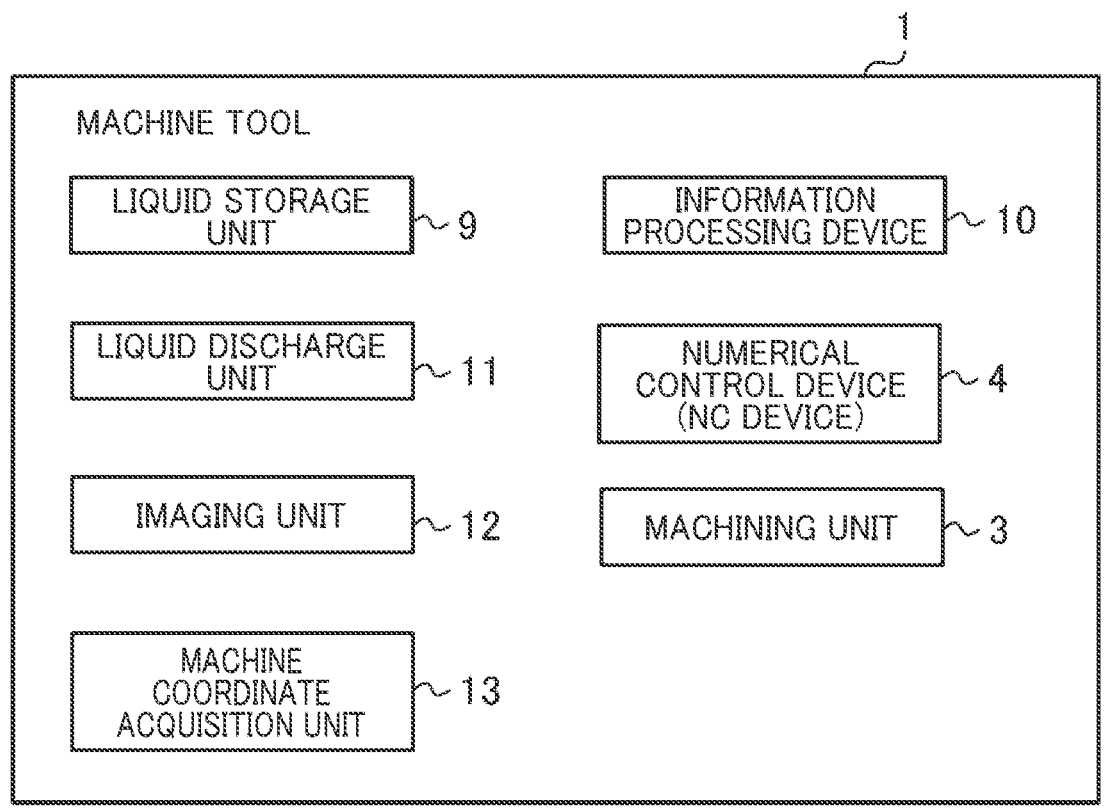
FIG. 1 is a block diagram illustrating a configuration of a machine tool.

Hereinafter, an information processing device, a machine tool, and an information processing system according to an embodiment will be described with reference to the drawings. In the following description, the same components are denoted by the same reference numerals and the description thereof is omitted.

The "machine tool" described below is a tool for machining a workpiece such as a metal into a desired shape by cutting or grinding, for example. Chips are generated during cutting and grinding with the machine tool. The "machine tool" may be an additional processing machine for dissolving metal powder to form a workpiece. In such an additional processing machine, the metal powder which did not constitute a workpiece remains as waste. Waste such as chips and powder debris are examples of substances that are scattered and should be removed during machining process by the machine tool. It should be noted that the substance that are scattered and should be removed during machining process by the machine tool is not limited to a solid, but may be a liquid.

The present embodiment shows a cleaning method for spraying liquid (e.g., coolant liquid) toward chips, but the cleaning may be performed by spraying gas (e.g., air) toward chips. The same is true when other waste such as powder debris is generated.

In the present embodiment, the "information processing device" and the "information processing system" manage the time-series change of chips generated during machining in the machine tool, but it is also possible to manage the time-series change of powder debris and other waste.

Embodiment

Machine Tool

An example of a machine tool 1 according to an embodiment will be described with reference to FIG. 1. The machine tool 1 processes an object workpiece. By machining the workpiece, chips separated from a part of the workpiece are accumulated in the machine tool 1. For example, the machine tool 1 includes: a machining unit 3 which includes a servomotor for driving a spindle and selectively uses various tools to machine a workpiece in a machining chamber; a numerical control device 4 which controls a liquid discharge unit 11 and the machining unit 3; a liquid storage unit 9 which stores liquid; a liquid discharge unit 11 which discharges liquid for moving chips generated during machining; an imaging unit 12 which images the inside of the machine tool 1; a machine coordinate acquisition unit 13; and an information processing device 10 which manages time-series changes in chip accumulation generated during machining.

A nozzle controlling information processing device (e.g., a computer) other than the numerical control device 4 may issue an instruction to a nozzle drive motor control board mounted on the machine tool to control the movable coolant nozzle of the liquid discharge unit 11. The nozzle controlling information processing device may utilize a signal of a programmable logic controller (PLC) for controlling the coolant in cooperation with the numerical control device 4.

The numerical control device 4 has a numerical control function by being equipped with a numerical control (NC) for servo motor control, etc. and a programmable logic controller (PLC) for sequence control, etc.

The liquid discharge unit 11 discharges liquid (e.g., coolant liquid) stored in the machine tool 1 in order to move chips (an example of substance) accumulated in the machine tool 1 under the control of the numerical control device 4. The machine tool 1 can collect the chips thus moved and discharge them to the outside of the machining area. The liquid discharge unit 11 includes, e.g., a nozzle capable of discharging liquid, an actuator for driving the nozzle, and a pump for pumping the liquid from the liquid storage unit 9 for storing the liquid, and discharges the liquid from the nozzle toward the chips. As the liquid, a coolant for cooling and lubricating the workpiece and processing means which generate heat during processing may be used, or other liquid may be used. Hereinafter, an example of using a coolant as the liquid for moving chips will be described. In order to spray the liquid toward a specific position inside the machine tool 1, the liquid discharge unit 11 is configured so that the position and direction of the nozzle as well as the discharge pressure of the liquid can be adjusted in accordance with a target point indicating a target position inside the machine tool 1. Further, the machine tool 1 may include a plurality of liquid discharge units 11.

The imaging unit 12 is, e.g., a camera including an imaging device such as a CCD or CMOS. The imaging unit 12 can image the inside of the machine tool 1 at a predetermined timing. Specifically, the imaging unit 12 images the inside of the machine tool 1 including a scattering range of a substance scattered during machining by the machine tool. The imaging unit 12 outputs image data of the captured image (hereinafter referred to as "first image data") to the information processing device 10. For example, the imaging unit 12 images the workpiece at a periodic timing during processing. The imaging unit 12 may capture an image at a timing at which the processed workpiece is removed from the machine tool 1 and before a new workpiece is placed therein. In order to grasp the state across a wide range, the machine tool 1 may be provided with a plurality of imaging units 12.

Figure 2:
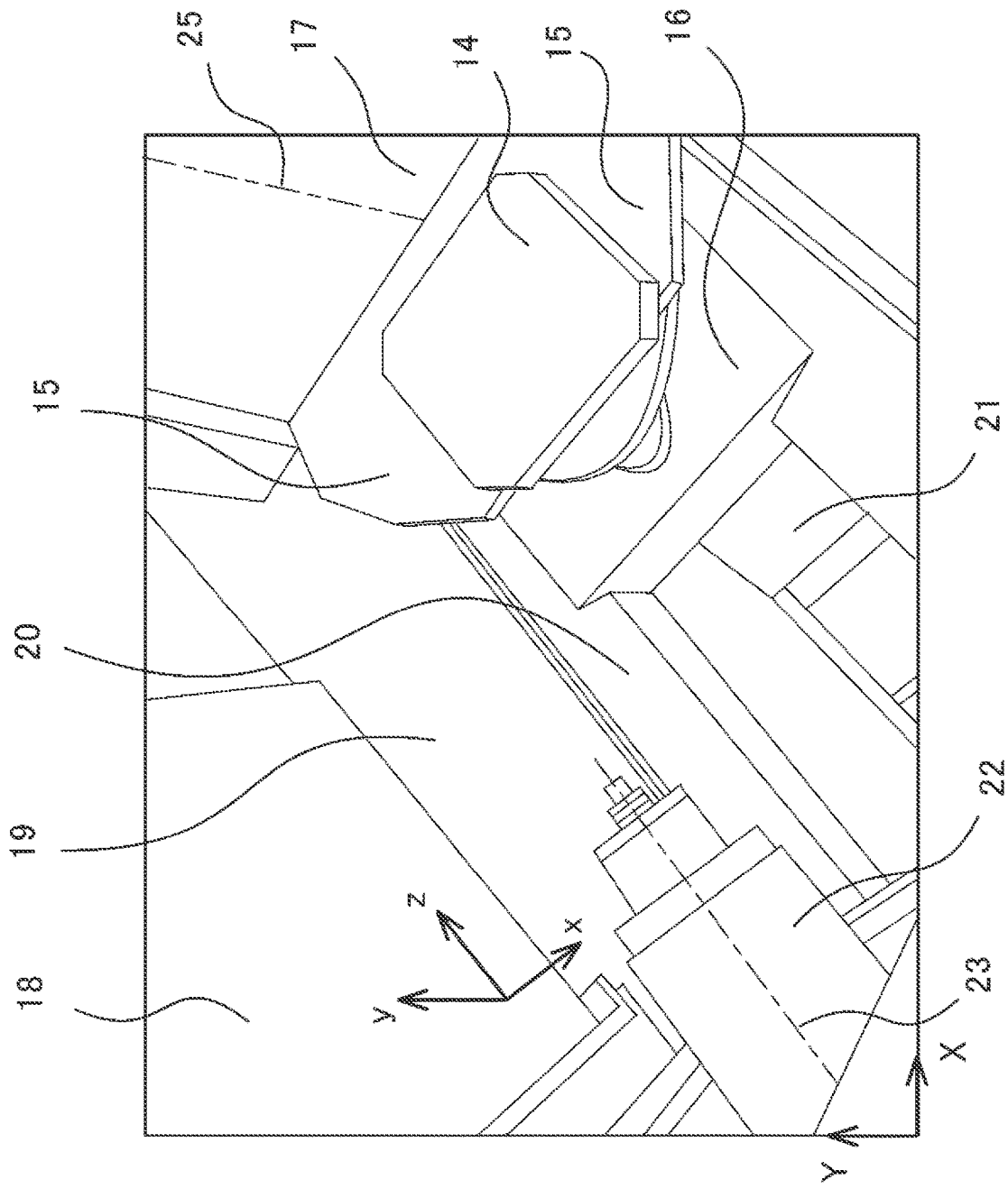
FIG. 2 is a captured image of the inside of the machine tool.

The machine coordinate acquisition unit 13 acquires machine coordinates representing positions of moving parts in the machine tool 1, such as a pallet 14, a table 16, and a spindle 22 among the structures of the machine tool 1, which will be described later with reference to FIG. 2. The machine coordinate acquisition unit 13 transmits the acquired machine coordinates to the information processing device 10. The machine coordinates may be obtained, e.g., by using position information transmitted from the numerical control device 4 to the machine tool 1 for machining, or by using some kind of sensor.

Figure 3:
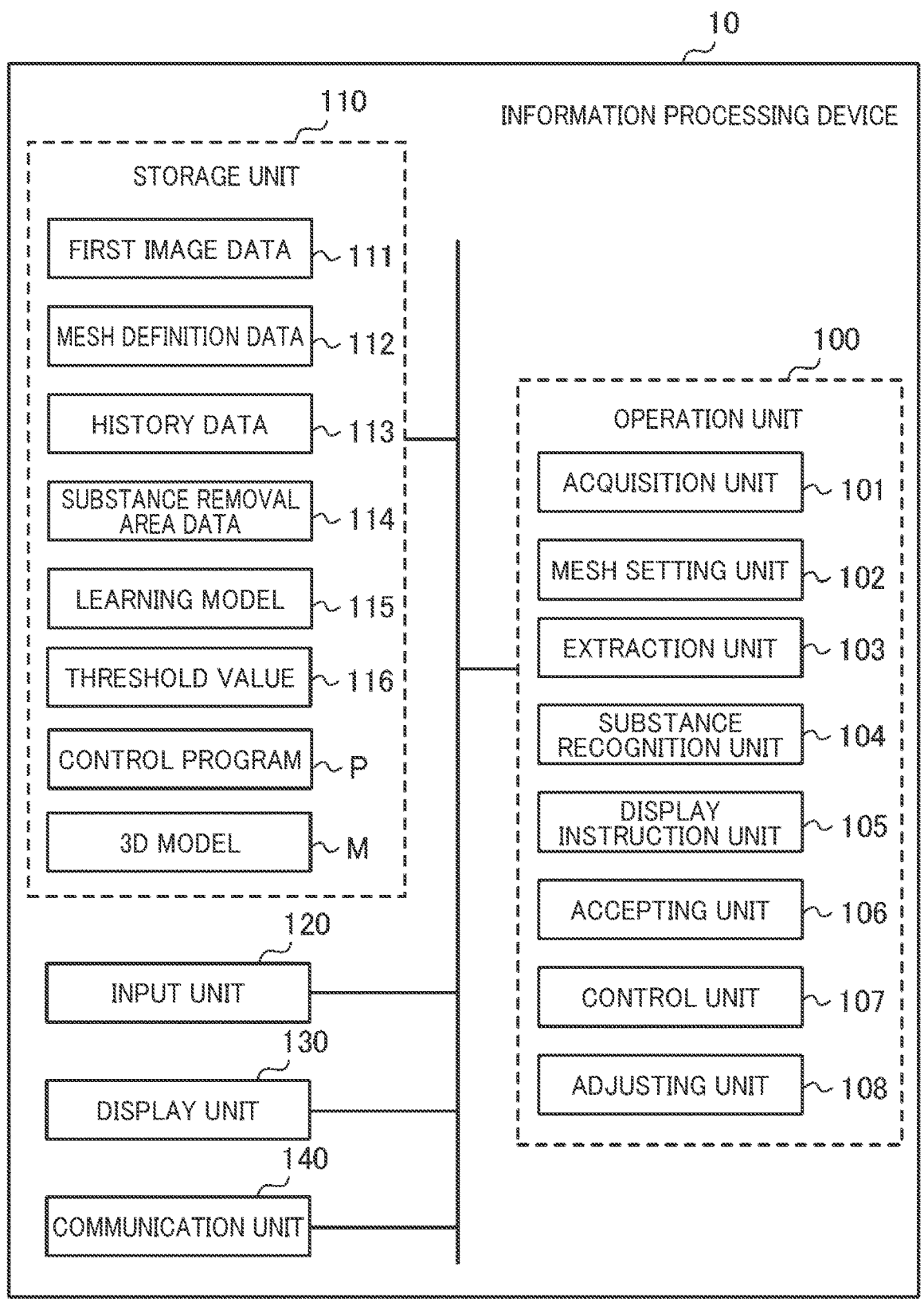
FIG. 3 is a block diagram illustrating a configuration of an information processing device.

The information processing device 10 will be described later with reference to FIG. 3. Although not shown in FIG. 1, the machine tool 1 includes various other components described with reference to FIG. 2. FIG. 2 is a captured image of the inside of the machine tool 1, showing a pallet 14, a cover 15, a table 16, a revolving door 17, a side surface 18, a slope 19, a protector 20, a shooter 21, and a spindle 22. In this embodiment, the longitudinal axis 23 of the spindle 22 shown in FIG. 2 is the z-axis, and the root side of the spindle 22 is the front side and the tip side of the spindle 22 is the rear side in the front-rear direction inside the machine tool 1. The horizontal direction orthogonal to the spindle 22 is the x-axis or the left-right direction, and the vertical direction orthogonal to the longitudinal axis 23 is the y-axis or the upper-lower direction.

The pallet 14 is a stand on which a workpiece is mounted and fixed. The machine tool 1 is configured to hold a plurality of pallets 14, and one pallet is disposed in a machining area to machine a workpiece. When machining of a workpiece is completed, the pallet on which the workpiece is placed is moved from the machining area to the pallet housing unit, and another pallet is disposed in the machining area to machine another workpiece. Replacing the whole pallet 14 mounting a workpiece can improve the work efficiency of the workpiece replacement.

The cover 15 is a component located on the left and right sides of the pallet 14. The table 16 can be moved in the front-rear direction, thereby moving the workpiece fixed on the pallet 14. At least a portion of the table 16 can be rotated in the horizontal direction, thereby rotating the workpiece fixed on the pallet 14.

The revolving door 17 is a door that can rotate about an axis 25. The revolving door 17 rotates together with the pallet 14 and the cover 15 so that the cover 15 separates the pallet 14 from the table 16. Thus, a pallet 14 mounting a machined workpiece can be carried out to the pallet storage unit, and a pallet 14 mounting a workpiece to be machined can be carried into the machine tool 1 from the pallet storage unit. The cover 15 may be provided on both the inside of the machine tool 1 and the storage unit side of the revolving door 17, and the revolving door 17 may be rotated by 180° to simultaneously carry in and carry out the pallet 14.

The side surface 18 is an openable/closable wall of the machine tool 1. The side surface 18 partitions the inside and the outside of the machine tool 1, and when the side surface 18 is opened, a worker can enter the inside of the machine tool 1. A side surface 18 (not shown) facing the side surface 18 separates the inside of the machine tool 1 and the tool storage unit. The tool storage unit stores a plurality of tools, the side surface 18 is opened as necessary during machining, and a tool attached to the spindle 22 can be replaced with another tool stored in the tool storage unit.

The shooter 21 is a place into which chips flow by cleaning. The side surface 18 and the protector 20 are respectively provided below the revolving door 17 and the side surface 18, and are respectively inclined downward toward the shooter 21 so that chips can easily flow into the shooter 21.

A tool is attached to the tip of the spindle 22, and the spindle is rotated around its longitudinal axis 23 to machine a workpiece. That is, the spindle 22 to which the tool is attached and a servomotor for driving the spindle 22 corresponds to the machining unit 3. In this embodiment, as shown in FIG. 2, the spindle 22 has a cylindrical outer shape.

Information Processing Device

An example of the information processing device 10 according to an embodiment will be described with reference to FIG. 3. The information processing device 10 includes an operation unit 100, a storage unit 110, an input unit 120, a display unit 130, and a communication unit 140. This information processing device 10 is, e.g., an information processing device such as a computer or a tablet terminal.

The operation unit 100 is a controller that controls the entire information processing device 10. For example, the operation unit 100 reads and executes a control program P stored in the storage unit 110, thereby executing processing to function as an acquisition unit 101, a mesh setting unit 102, an extraction unit 103, a substance recognition unit 104, a display instruction unit 105, an accepting unit 106, a control unit 107, and an adjusting unit 108. Further, the operation unit 100 is not limited to one which implements predetermined functions by the cooperation of hardware and software, and may be a hardware circuit designed dedicatedly for implementing the predetermined function. That is, the operation unit 100 can be implemented by various processors such as a CPU, an MPU, a GPU, an FPGA, a DSP, and an ASIC.

The storage unit 110 is a recording medium for recording various kinds of information. The storage unit 110 is implemented by, e.g., a RAM, a ROM, a flash memory, a solid state device (SSD), a hard disk, other storage devices, or a combination thereof. The storage unit 110 stores various data and the like used by the machine tool 1 in addition to the control program P executed by the operation unit 100. For example, the storage unit 110 stores first image data 111, mesh definition data 112, history data 113, substance removal area data 114, a learning model 115 and a threshold value 116, the control program P, and a 3D model M. The 3D model M is three-dimensional data defining the structures in the machine tool.

The input unit 120 is input means such as a keyboard, a mouse, and a touch panel used for inputting data and operation signals. The display unit 130 is output means such as a display used for outputting data.

The communication unit 140 is an interface circuit (module) for enabling data communication with an external device (not shown). For example, the communication unit 140 can perform data communication with the imaging unit 12. The communication unit 140 includes a transmitting unit that transmits a control signal for instructing cleaning to the numerical control device 4. The transmitting unit of the communication unit 140 may transmit a control signal instructing cleaning to a nozzle driving motor control board installed in the machine tool.

The acquisition unit 101 acquires the first image data 111 from the imaging unit 12. The acquisition unit 101 associates the image ID for identifying the captured image and the imaging time with the acquired first image data 111 and stores them in the storage unit 110. Therefore, the storage unit 110 can store a plurality of first image data 111 of the same target region captured at different timings.

The mesh setting unit 102 sets a plurality of mesh zones in at least a part of the captured image. For example, when an image of the inside of the machine tool 1 is captured as shown in FIG. 2, a plurality of mesh zones as shown in FIG. 4 are set in the captured image including a scattering range of a substance scattered during machining by a machine tool.

The "scattering range of a substance scattered during machining by a machine tool" means a place where a substance such as chips, powder debris, liquid, or the like scattered by the force of machining such as cutting and polishing may fall. In this example, since the chips scattered by the force of the cutting may fall on the pallet 14, at least the pallet 14 corresponds to the "scattering range of a substance scattered during machining by a machine tool".

Figure 4:
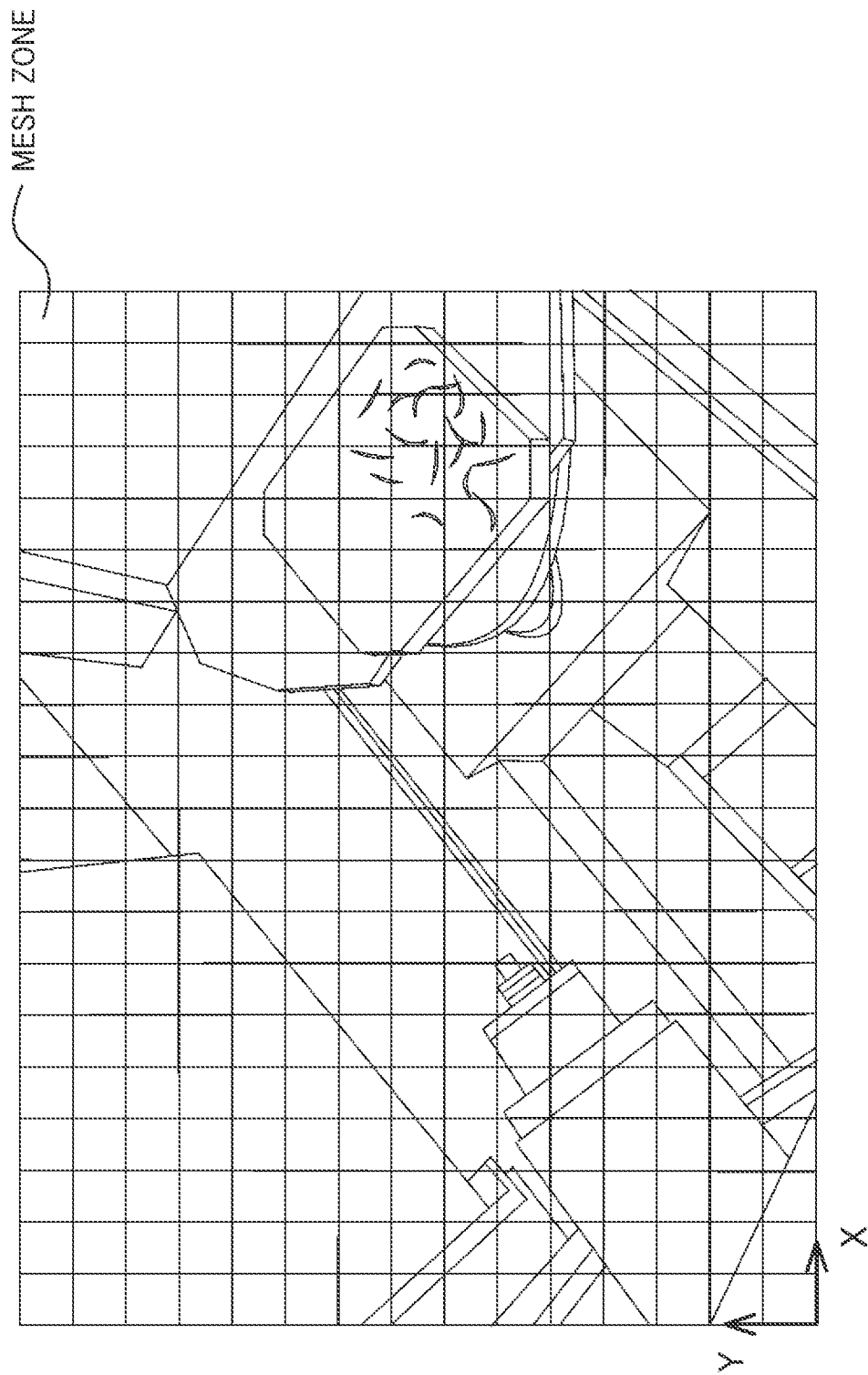
FIG. 4 illustrates an example of mesh zones generated by the information processing device.

In the example of FIG. 4, a plurality of horizontal lines are set to divide the captured image at equal intervals, and a plurality of vertical lines are set to divide the captured image at equal intervals. A rectangle surrounded by two adjacent vertical lines and two adjacent horizontal lines is set as a mesh zone. The mesh zone is specified by row number and column number. For example, the mesh zone in the upper left corner is identified by row number 1 and column number 1. If the total number of rows is 15 and the total number of columns is 20 as shown in FIG. 4, the mesh zone in the lower right corner is identified by row number 15 and column number 20. Hereinafter, the zone ID of the mesh zone specified by the row number x and the column number y is represented as Ax-y. For example, the zone ID of the mesh zone in the upper left corner is represented as A1-1, and the zone ID of the mesh zone in the lower right corner is represented as A15-20. The right direction corresponds to the X axis and the upper direction corresponds to the Y axis.

Further, with regard to each of the mesh zone, definition information that specifies the range of the mesh zone is generated. Since each mesh zone is rectangular and has a constant width and height, a single reference point, such as the upper left corner, is sufficient to set the definition information. The definition information of each mesh zone is associated with the zone ID of the mesh zone and stored in the storage unit 110 as the mesh definition data 112.

FIG. 4 shows an example in which mesh zones are set for the entire captured image, but the present invention is not limited thereto. Specifically, the mesh setting unit 102 may set the mesh zones only for a part of the captured image. The size and shape of the mesh zones to be set may be configured to be changeable as necessary. For example, if the rectangle shapes of the mesh zones are not uniform, the positions of the first reference point at the upper left end and the second reference point at the lower right end may be used as the definition information.

The extraction unit 103 extracts an image of the mesh zone (hereinafter referred to as "mesh image") from the captured image on the basis of the definition information of the mesh zone. In the present embodiment, an image of one mesh zone is referred to as a mesh image, but the present invention is not limited thereto. The captured image and the information of the mesh zones may be stored in association with each other, and the data of one mesh zone may be used on the basis of the information. Further, the captured image itself may be divided to generate and use a divided image as second image data for each mesh zone.

Figure 5:
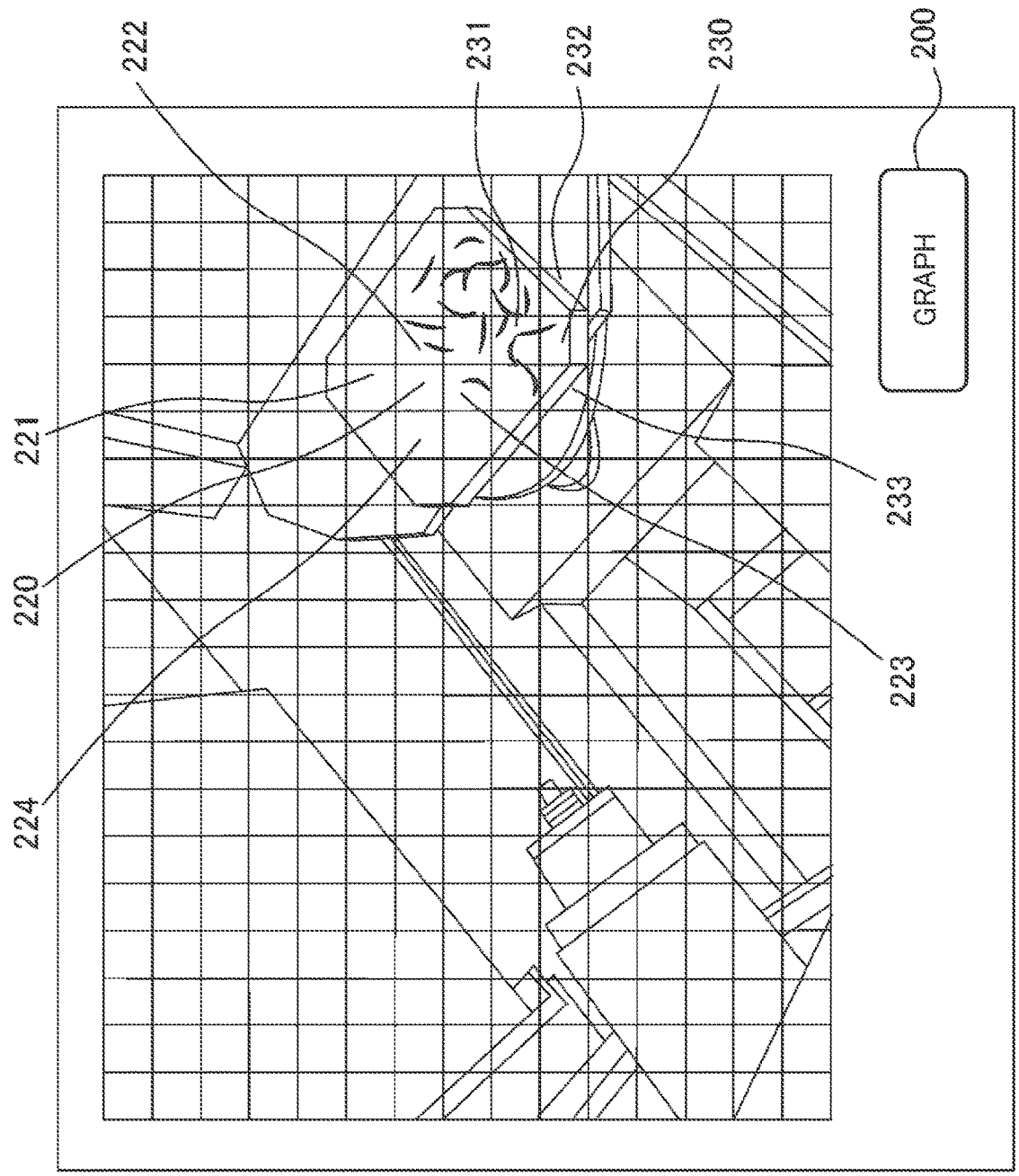
FIG. 5 is an example of a main screen.

The display unit 130 displays various screens such as a main screen shown in FIG. 5. On the main screen, vertical and horizontal lines setting respective mesh zones are superimposed and displayed on the captured image. The user selects an arbitrary mesh zone in the captured image as a target area for chip removal. The chip removal in this example is an example of substance removal. Hereinafter, an area for removing chips (an example of substance) selected by the user is referred to as a "substance removal area". In this example, it is assumed that the pallet 14 is a substance removal area.

The user selects mesh zones covering the substance removal area (e.g., the pallet 14). In other words, the user touches each mesh zone that includes at least a portion of the substance removal area. A shaded pattern is superimposed on each selected mesh zone. The number of mesh zones selected may be one or more. When a plurality of mesh zones are selected, it means that the mesh zones together cover the substance removal area. The zone IDs of the selected mesh zones are added to the substance removal area data 114. It is also possible to cancel the selection of the mesh zones. When a user touches a mesh zone on which a shading pattern is displayed, the selection of the mesh zone is canceled. In that case, the shading pattern on the touched mesh zone disappears. Then, the zone ID of the touched mesh zone is deleted from the substance removal area data 114.

As shown in FIG. 5, the area includes a first selected mesh zone 220 and a second selected mesh zone 230. Around the first selected mesh zone 220, there are a selected mesh zone 221 adjacent to the upper side of the first selected mesh zone 220, a selected mesh zone 222 adjacent to the right side of the same, a selected mesh zone 223 adjacent to the lower side of the same, and a selected mesh zone 224 adjacent to the left side of the same. Around the second selected mesh zone 230, there are a selected mesh zone 231 adjacent to the upper side of the second selected mesh zone 230, a selected mesh zone 232 adjacent to the right side of the same, and a selected mesh zone 233 adjacent to the left side of the same. The area of this embodiment includes the first selected mesh zone 220 and the second selected mesh zone 230. The area of one example of the present embodiment also includes four selected mesh zones adjacent to the first selected mesh zone 220 and three selected mesh zones adjacent to the second selected mesh zone 230. That is, an arbitrary shape in the image can be extracted as an area. Thus, the selected area is "an area formed by selecting mesh zones according to shapes inside the machine tool" and is "an area including (i) selected first selected mesh zone 220, (ii) four selected mesh zones adjacent to the selected first selected mesh zone 220, (iii) selected second selected mesh zone 230, and (iv) three selected mesh zones adjacent to the selected second selected mesh zone 230". The accepting unit 106 accepts selection of an area including the first selected mesh zone 220 and the second selected mesh zone 230. Area data that associates selection candidate areas with a plurality of mesh zones included in the area may be stored in an area data storage unit so that an area including a plurality of mesh zones can be collectively selected. In this case, the accepting unit 106 accepts selection of the area to which the mesh zones selected by touch operation or the like belongs. For example, an area having a size corresponding to a shape in the machine tool, such as the shape of the pallet 14, can be arbitrarily selected.

When the user touches a graph button 200, an indicator graph screen is displayed. The indicator graph screen will be described later with reference to FIG. 8.

Figure 6:
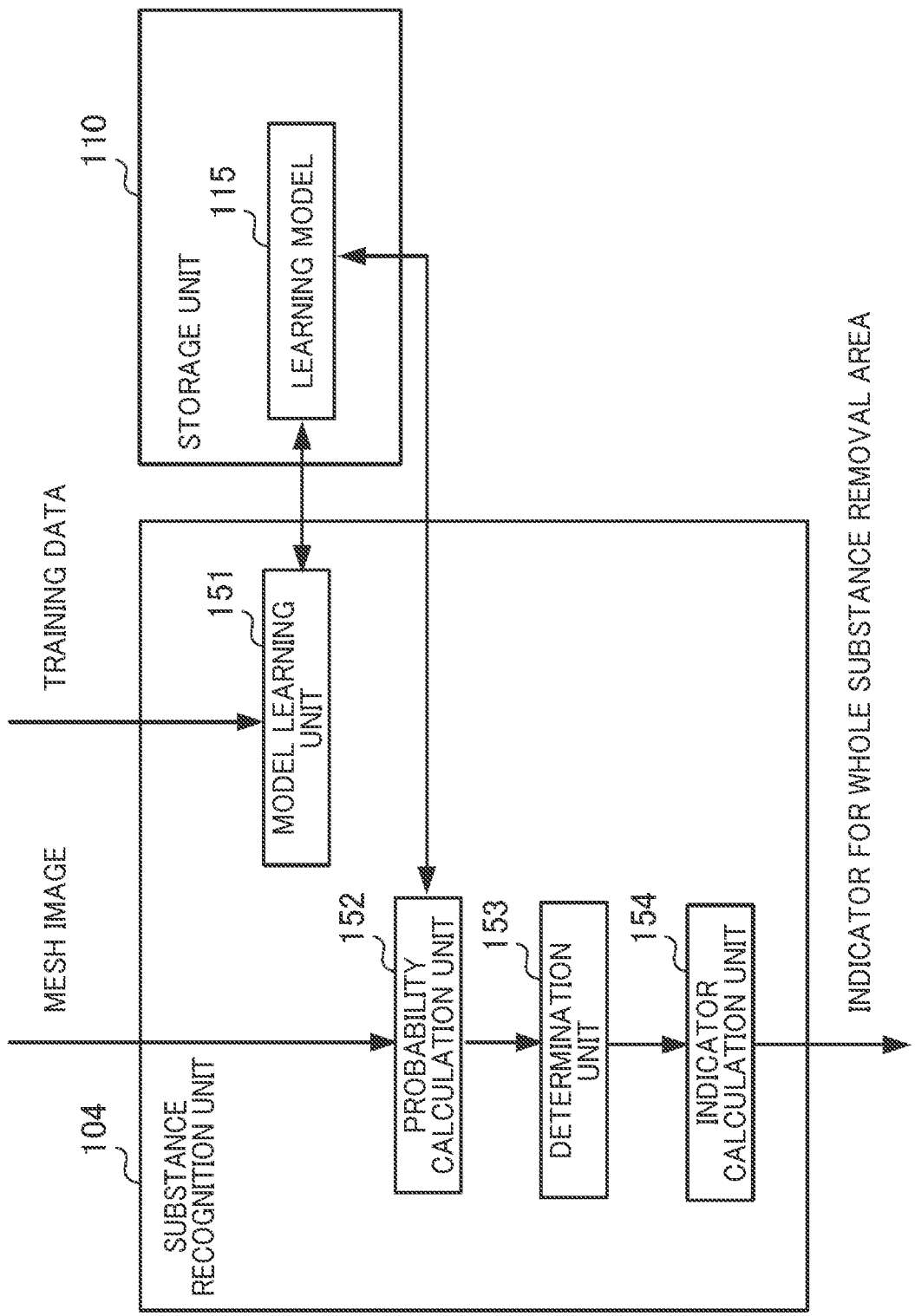
FIG. 6 is a block diagram illustrating a configuration of a recognition unit.

The substance recognition unit 104 recognizes the state of the accumulation of chips (an example of substance) in the mesh zones corresponding to the substance removal area. FIG. 6 is a schematic diagram of a configuration of the substance recognition unit 104. As shown in FIG. 6, the substance recognition unit 104 includes a model learning unit 151, a probability calculation unit 152, a determination unit 153, and an indicator calculation unit 154. The storage unit 110 stores the learning model 115. It should be noted that the substance recognition unit 104 does not recognize the kind of substance present, but recognizes the situation in which a substance exists. In this example, the substance recognition unit 104 recognizes the accumulation state of chips, but may recognize the state of other debris such as powder debris. Further, the substance recognition unit 104 may recognize not only the solid but also the adhesion state of fluid substance.

In this example, the state of chip accumulation in mesh zones is represented in multiple steps. Hereinafter, the state of chip accumulation in mesh zones is referred to as the "mesh zone substance state". The "mesh zone substance state" may be expressed, e.g., as a class. Mesh zone substance state 0 (Class 0) means "no chip". Mesh zone substance state 1 (Class 1) means "few chips". Mesh zone substance state 2 (Class 2) means "many chips".

The model learning unit 151 creates a learning model. This learning model uses, e.g., a CNN (convolutional neural network) which uses one mesh image as input data and outputs probability corresponding to each mesh zone substance state as output data. The model learning unit 151 obtains a learning model by learning processing of a CNN using paired input data and output data as training data. The learning model 115 is stored in the storage unit 110. In the CNN, features of the mesh image are extracted in the convolution layer and the pooling layer, and the features are used as input data of the neural network. A learning engine other than CNN may be used to create the learning model. In this case, a feature obtained by applying a mesh image to a predetermined image processing filter may be used as input data of the learning engine. The substance recognition unit 104 may determine the mesh zone substance state by using, e.g., a decision tree.

Here, for convenience of explanation, an example in which learning is performed by the substance recognition unit 104 is shown in FIG. 6, but learning may not be performed by the substance recognition unit 104.

The learning process, i.e., supplying input data (mesh image) and output data ("substance state" expressed in classes) to a learning engine (learning model in a narrow sense) as training data to obtain a learning parameter, is performed in a learning computer. In this learning process, only the learning parameter changes and the learning engine (learning model in a narrow sense) does not change. The learning engine (learning model in a narrow sense) refers to a CNN or deep neural network (DNN) designed by developers. The substance recognition unit 104 recognizes the situation or state of chips or debris by using the generated learning model.

The prepared learning engine (learning model in a narrow sense) and the learning parameter are both stored in the storage unit 110 of the product before shipment. The learning engine (learning model in a narrow sense) stored in the storage unit 110 of a product and a learning parameter may be collectively referred to as a learned inference model (learning model in a broad sense). Regarding a learned inference model (learning model in a broad sense) after shipment, neither a learning engine (learning model in a narrow sense) nor learning parameters are changed except for a case of a version upgrade in an operation stage. The learning model 115 shown in FIG. 6 represents a learned inference model (learning model in a broad sense).

As described above, the model learning unit 151 shown in FIG. 6 may not be incorporated in the product at the time of shipment. In other words, new learning is not performed by using images during machining with the machine tool. On the contrary, when learning is performed on the product at the operation stage while performing processing by the machine tool, the model learning unit 151 shown in FIG. 6 may be incorporated in the product at the time of shipment.

The probability calculation unit 152 calculates the likelihood of each mesh zone substance state (class 0 to 2) by using an inference model stored in the model learning unit 151 at the time of shipment. In this example, the likelihood of the substance state (class 0 to 2) is expressed as "probability". In this example, "probability" is exchangeable with "likelihood". The inference model is a complicated function using a mesh image as input data to output a likelihood of a substance state (class 0 to 2) as output data, and learning parameters obtained by learning are used as coefficients of the function.

The probability calculation unit 152 obtains the probability of each mesh zone substance state with respect to an arbitrary mesh image by using the learning model 115. That is, by using the mesh image as the input data of the learning model 115, it is possible to obtain, as output data, the probability that the mesh image corresponds to the mesh zone substance state 0, the probability that the mesh image corresponds to the mesh zone substance state 1, and the probability that the mesh image corresponds to the mesh zone substance state 2. Note that the number of mesh zone substance states is not limited to three. The number may be two and may be four or more. If the number of mesh zone substance states is two, only the presence or absence of chips may be distinguished.

The determination unit 153 determines the valid mesh zone substance state (one class out of the classes 0 to 2) on the basis of the probability of each mesh zone substance state calculated by the probability calculation unit 152. For example, the mesh zone substance state with the highest probability is selected.

The substance recognition unit 104 may recognize the shape of chips, the size of chips, the type of chips, the amount of accumulated chips, or the like and use it as the mesh zone substance state. The amount of accumulated chips may be the weight, volume, or number of accumulated chips.

The indicator calculation unit 154 further calculates an indicator indicating the accumulation state of chips (an example of substance) as a whole in a plurality of mesh zones included in the substance removal area. Each mesh zone substance state is assigned a predetermined score. For example, "mesh zone substance state 2" is assumed to be 8 points, "mesh zone substance state 1" is assumed to be 3 points, and "mesh zone substance state 0" is assumed to be 0 points. Thus, scores are assigned to each of the mesh zones covering the substance removal area. Then the indicator calculation unit 154 sums the scores of each of the mesh zones. The indicator for the whole substance removal area is obtained by normalizing the calculated total score. For example, the indicator calculation unit 154 uniformly corrects the total score by a calculation method in which the logical highest score becomes 100. In the example of FIG. 5, since the number of mesh zones is 30, the highest score is 30×8=240 points if all mesh zones are in the "mesh zone substance state 2". Thus, an indicator for the whole substance removal area with an upper limit of 100 and a lower limit of 0 can be obtained by multiplying the total points by 100/240. The indicator for the whole substance removal area may be an average score of all of the respective mesh zones. In this case, the upper limit of the indicator for the whole substance removal area is 8 and the lower limit is 0. Further, the value obtained by normalizing the average value may be used as an indicator for the whole substance removal area.

Information obtained by the substance recognition unit 104 is stored as the history data 113. FIG. 7 shows an example of the history data 113. A record is provided for each imaging time. The record includes the image ID of the captured image, the time point of imaging, the mesh zone substance state of each of the mesh zones covering the substance removal area, and the indicator for the whole substance removal area.

In the example of FIG. 7, e.g., it can be seen that the mesh zone substance state of "A5-16" has changed to "0", "0", "1", "1", "2", "0", and "0". Further, between the timing of "T5" and the timing of "T6", liquid is discharged to the substance removal area, so that the value of each mesh zone substance state and the indicator for the whole substance removal area are reduced.

The display instruction unit 105 causes the display unit 130 to display various screens such as the main screen (FIG. 5) and the indicator graph screen. Specifically, the display instruction unit 105 generates images of various screens and instructs the display unit 130 to display the images.

Figure 8:
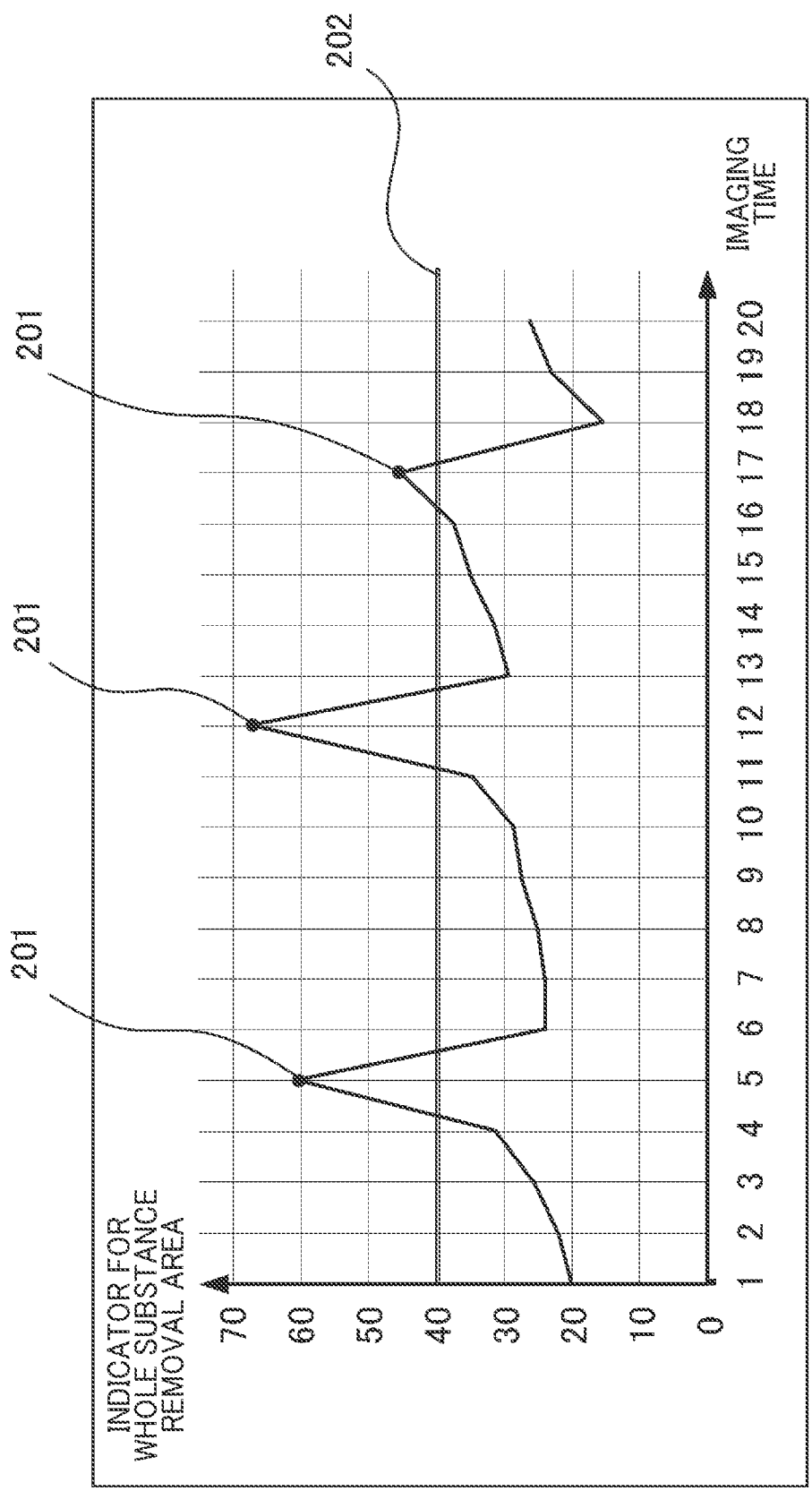
FIG. 8 is an example of an indicator graph screen displayed by the information processing device.

As shown in FIG. 8, the indicator graph screen shows the indicators for the whole substance removal area for each imaging cycle in time series. The indicator graph screen is displayed on the display unit 130. Therefore, the display instruction unit 105 instructs the display unit 130 to display the threshold level of the indicator on a graph screen representing the indicators for each imaging cycle in time series. The indicator graph screen also displays a threshold line 202 indicating the level of the threshold value 116. A round mark 201 is displayed on the indicator for the whole substance removal area exceeding the threshold value 116. The machine tool 1 performs cleaning when the indicator for the whole substance removal area exceeds the threshold value 116. In other words, the round mark 201 indicates that cleaning has been performed at that time. Cleaning is an example of substance removal.

In this example, as indicated by the threshold line 202, the threshold value 116 is set to 40. For example, since the indicator for the whole substance removal area from the first to the fourth times does not exceed the threshold value 116, no cleaning (example of substance removal) is performed. Therefore, chips increase during that time, and the indicator for the whole substance removal area increases. When the indicator for the whole substance removal area exceeds the threshold value 116 at the fifth time, cleaning is performed. Cleaning reduces chips and lowers the indicator for the whole substance removal area at the sixth time. Thus, an increase in the indicator for the whole substance removal area during the period in which no cleaning is performed and decrease in the indicator for the whole substance removal area due to cleaning are repeated. Therefore, a user can easily grasp the state change of the chips in the substance removal area by viewing the indicator graph screen.

It should be noted that the threshold value 116 can be adjusted by a user operation. In this example, the threshold value can be increased or decreased by touching and sliding the threshold line 202 displayed on the indicator graph screen. Alternatively, the threshold value 116 may be changed by inputting a numerical value. The adjusting unit 108 corrects the threshold value according to an operation for changing the level of the threshold value of the indicator on the indicator graph screen. The information processing device 10 also has a function of automatically adjusting the threshold value 116. The automatic adjustment of the threshold value 116 will be described later.

The accepting unit 106 accepts a user operation by acquiring an input signal from the input unit 120. Specifically, the accepting unit 106 accepts a touch operation for selecting one or more mesh zones corresponding to an area for removing a substance (substance removing area) from a plurality of mesh zones. The accepting unit 106 accepts operations such as a touch operation to the graph button 200, a slide operation of the threshold line 202, and a numerical input operation of the threshold value.

The control unit 107 generates a control signal for the liquid discharge unit 11. The contents of the control signal will be described later. The control unit 107 may add the control signal supplied to the liquid discharge unit 11 to the history data 113 stored in the storage unit 110.

The adjusting unit 108 adjusts the threshold value 116 according to user operation and automatically adjusts the threshold value 116.

The information processing device 10 can be implemented by one computer or one tablet. The machine tool 1 may incorporate the information processing device therein. Moreover, these processes may be implemented by a combination of a plurality of computers connected via a network as an information processing system. Alternatively, for example, all or part of the data stored in the storage unit 110 may be stored in an external recording medium connected via a network (not shown), and the information processing device 10 and the information processing system may be configured to use the data stored in the external recording medium.

Liquid Discharge Process

Figure 9:
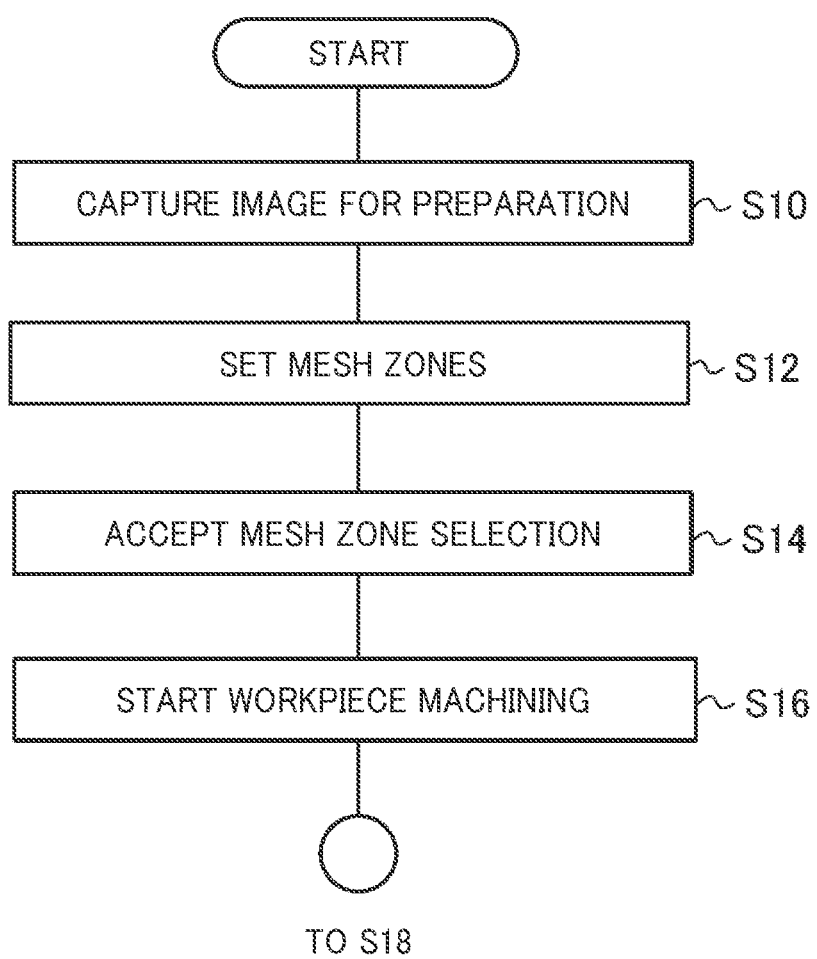
FIG. 9 is a flowchart for explaining a liquid discharge process.

Processing of liquid discharge in the information processing device 10 according to the embodiment will be described with reference to flowcharts shown in FIGS. 9 and 10. The processes from S10 to S14 correspond to preparation before machining.

First, the imaging unit 12 captures an image for preparation. The acquisition unit 101 acquires the first image data 111 from the imaging unit 12 (S10).

The mesh setting unit 102 sets a plurality of mesh zones in a captured image and generates the mesh definition data 112 (S12).

The display instruction unit 105 displays a main screen on the display unit 130, and the accepting unit 106 accepts selection of one or a plurality of mesh zones covering a substance removal area. The accepting unit 106 stores the zone ID of each mesh zone selected by the user as the substance removal area data 114 (S14). At this time, the accepting unit 106 sets a default threshold value 116 or a threshold value 116 specified by the user for the substance removal area.

Subsequently, machining of the workpiece carried into the machine tool 1 is started (S16). Chips are generated during machining. The process proceeds to the process shown in FIG. 10.

A plurality of substance removal areas may be provided and different thresholds may be set for each area. For example, the threshold value for the area of the pallet 14 having the mesh zone number "30" is set to "20", and the threshold value for the cover area having the mesh zone number "50" is set to "40". Thus, in the case where a plurality of substance removal areas are provided, the processing in S22 to S30 shown in FIG. 10 is repeated for each substance removal area.

During machining, the imaging unit 12 captures images at a predetermined timing. For example, the imaging unit 12 periodically captures images. At each time of the image capturing, the acquisition unit 101 acquires the first image data 111 from the imaging unit 12 and stores it in the storage unit 110 (S18).

For each zone ID included in the substance removal area data 114, the extraction unit 103 extracts a mesh image from the captured image of the first image data 111, and the substance recognition unit 104 recognizes the substance state of the mesh zones (S20).

The substance recognition unit 104 calculates an indicator for the whole substance removal area on the basis of the substance state of the mesh zones of each zone ID included in the substance removal area data 114 (S22).

The substance recognition unit 104 adds imaging ID relating to the latest imaging time, respective mesh zone substance states of mesh zones covering the substance removal area, and an indicator for the whole substance removal area (S24) to the history data 113.

When the indicator graph screen is displayed, the display instruction unit 105 instructs the display unit 130 to display a line connecting the indicator for the whole substance removal area at the latest time and the indicator for the whole substance removal area at the previous time (S26). If the indicator for the whole substance removal area for the latest time exceeds the threshold value 116, a round mark 201 is also displayed.

If it is determined that the indicator for the whole substance removal area at the latest time exceeds the threshold value 116 (S28: YES), the control unit 107 generates a control signal for cleaning the chips in the area corresponding to each mesh zone, i.e., the substance removal area, and outputs the control signal to the liquid discharge unit 11 (S30). Thus, the liquid discharge unit 11 discharges liquid for moving the chips.

Here, it is assumed that transformation data for correlating the two-dimensional coordinates in the captured image with the three-dimensional coordinates in the machining space of the machine tool 1 is prepared in advance and stored in the storage unit 110. The control unit 107 converts the two-dimensional coordinates of each mesh zone into three-dimensional coordinates of the machining space of the machine tool 1, and adds the three-dimensional coordinates to the control signal as a target position (target point) of liquid discharge. The control unit 107 may associate the two-dimensional coordinates in the captured image with the three-dimensional coordinates in the machining space of the machine tool by using, e.g., the 3D model M as a procedure for generating the conversion data. As a specific procedure, the control unit 107 generates, e.g., a plan view of the 3D model M of each member in the machining space of the machine tool as viewed from the camera direction. Then, the control unit 107 superimposes the captured image on the plan view and converts the two-dimensional coordinates in the captured image into the two-dimensional coordinates in the plan view. The control unit 107 further converts the two-dimensional coordinates in the plan view into the three-dimensional coordinates of the 3D model M, whereby the three-dimensional coordinates in the machining space of the machine tool can be derived from the two-dimensional coordinates in the captured image.

Thereafter, when the machining by the machine tool 1 is completed (S32: NO), the process ends. On the other hand, if the machining by the machine tool 1 continues (S32: YES), the information processing device 10 returns to the processing of step S18 and repeats the processing of steps S18 to S30.

Thus, according to the machine tool 1 and the information processing device 10 according to the embodiment, the accumulation state of chips in the substance removal area can be grasped in time series. In addition, chips can be automatically removed according to the accumulation state of chips in the substance removal area.

Next, the effect of the threshold value 116 will be described. In the following, for the sake of simplicity, it is assumed that the indicator for the whole substance removal area increases at a constant pace.

Figure 11:
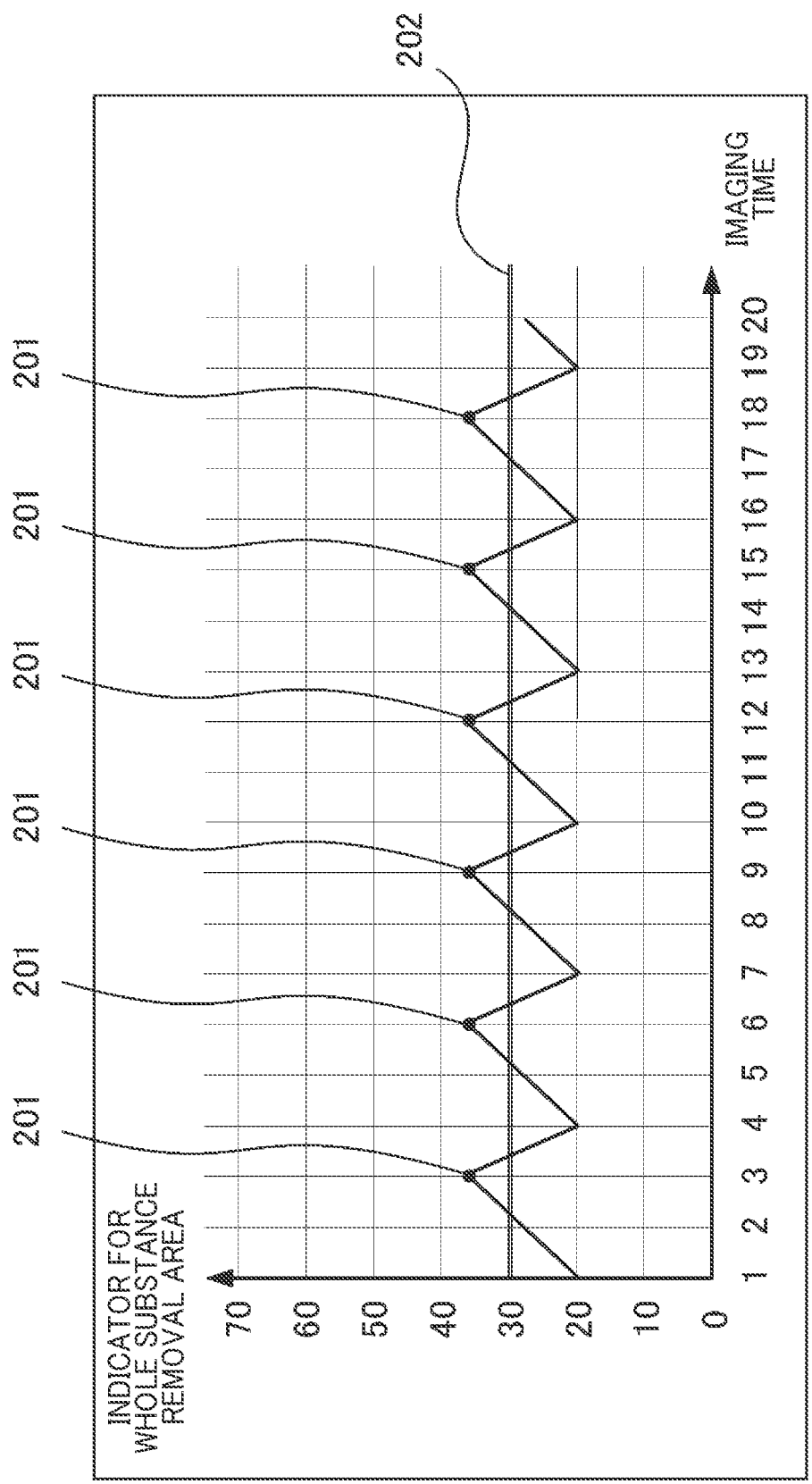
FIG. 11 is an example of an indicator graph screen displayed by an information processing device.

FIG. 11 is a diagram illustrating an example of an indicator graph screen when the threshold value 116 is "30". This represents a situation in which the threshold value 116 is set to "30", and the liquid is discharged at too early timing before chips are accumulated. There is potential to increase the interval between liquid discharges and to set a more efficient threshold value. In the case of FIG. 11, since the number of chips to be removed at the time of liquid discharge is small in the first place, the degree of improvement in this situation is low, so that the decrease in the indicator for the whole substance removal area by liquid discharge is small. As shown, the frequency of liquid discharge is about one time out of three times.

Figure 12:
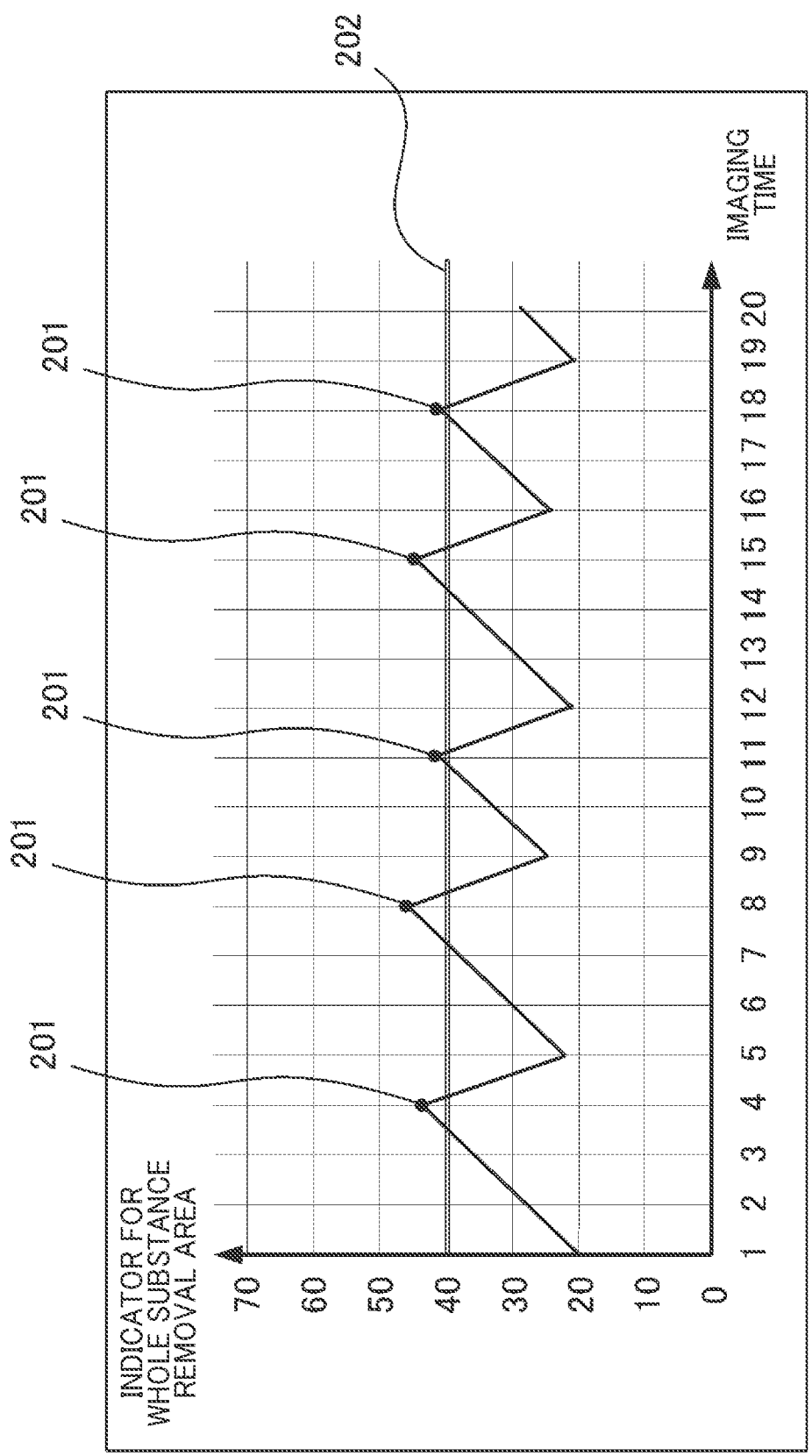
FIG. 12 is an example of an indicator graph screen displayed by an information processing device.

FIG. 12 is a diagram illustrating an example of an indicator graph screen when the threshold value 116 is "40". This represents a situation in which the threshold value 116 is set to "40", and the liquid is discharged at an appropriate timing after chips have accumulated to some extent. It can be considered that an efficient threshold value has been set and that there is no need to adjust the interval between liquid discharges. In the case of FIG. 12, since chips are accumulated enough to be sufficiently removed away when liquid discharge is performed, many chips can be removed by liquid discharge. Therefore, the overall reduction in the indicator for the substance removal area will be larger. As shown, the frequency of liquid discharge is about one time out of 3.5 times.

Figure 13:
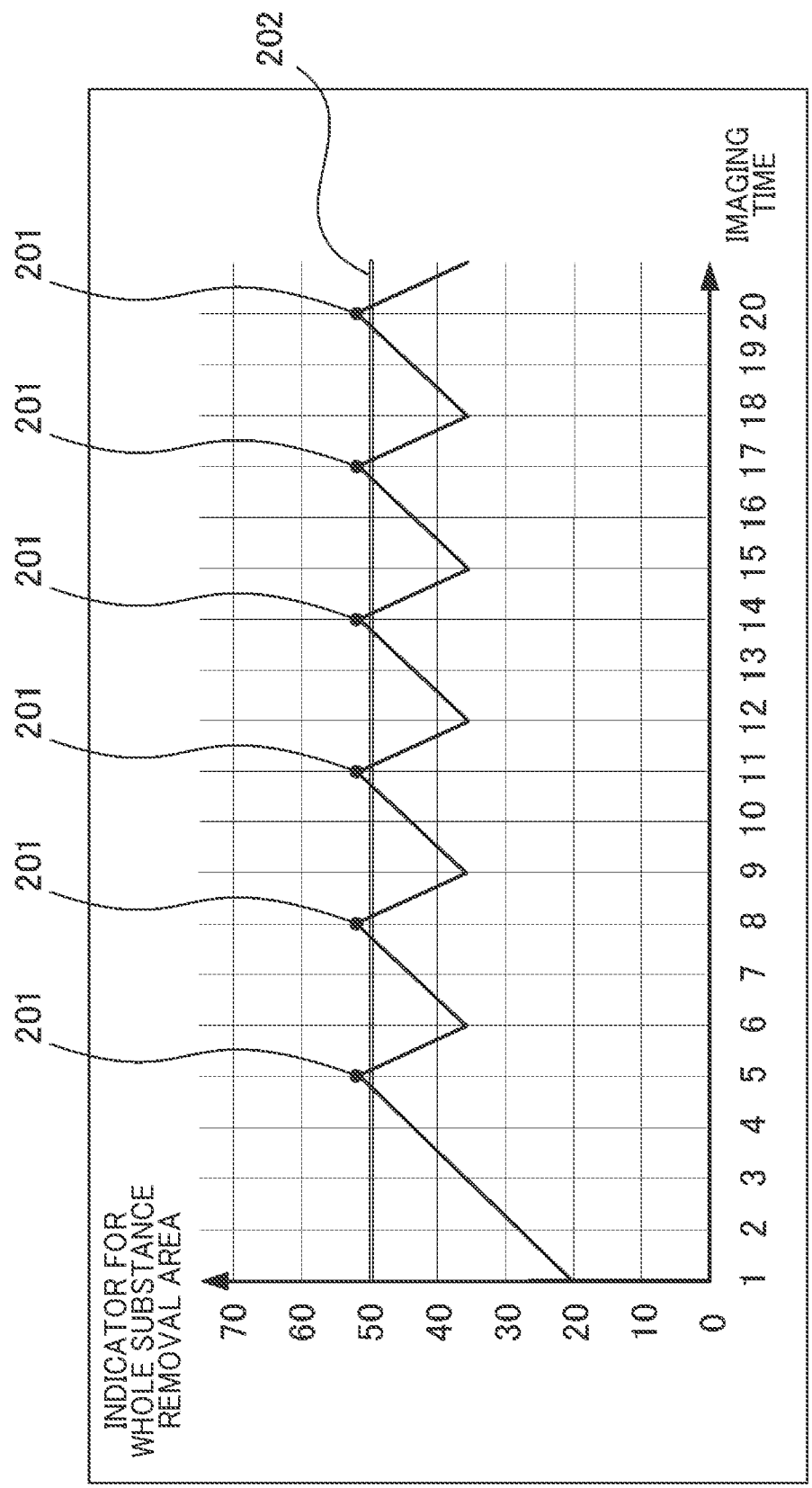
FIG. 13 is an example of an indicator graph screen displayed by an information processing device.

FIG. 13 is a diagram illustrating an example of an indicator graph screen when the threshold value 116 is "50". This represents a situation in which the threshold value 116 is set to "50", and the liquid is discharged at too late timing after the chips have accumulated too much. There is potential to decrease the interval between liquid discharges and to set a more efficient threshold value. In the case of FIG. 13, when liquid discharge is performed, chips accumulate too much and cannot be completely removed, so that the decrease in the indicator for the whole substance removal area by liquid discharge tends to be small. As shown, the frequency of liquid discharge is about one time out of three times.

Thus, an excessively small or large threshold value 116 will degrade the efficiency of cleaning (e.g., substance removal).

If the focus is only on reducing chips, the threshold value 116 may simply be reduced to allow frequent cleaning. However, frequent cleaning will elongate the cleaning time, which interrupts machining, and thus elongate the processing lead time.

Therefore, the threshold value 116 should be adjusted to an appropriate value in order to improve cleaning efficiency. Adjustment of the threshold value 116 may be a manual adjustment process or an automatic adjustment process. First, the manual adjustment process will be described.

Figure 14:
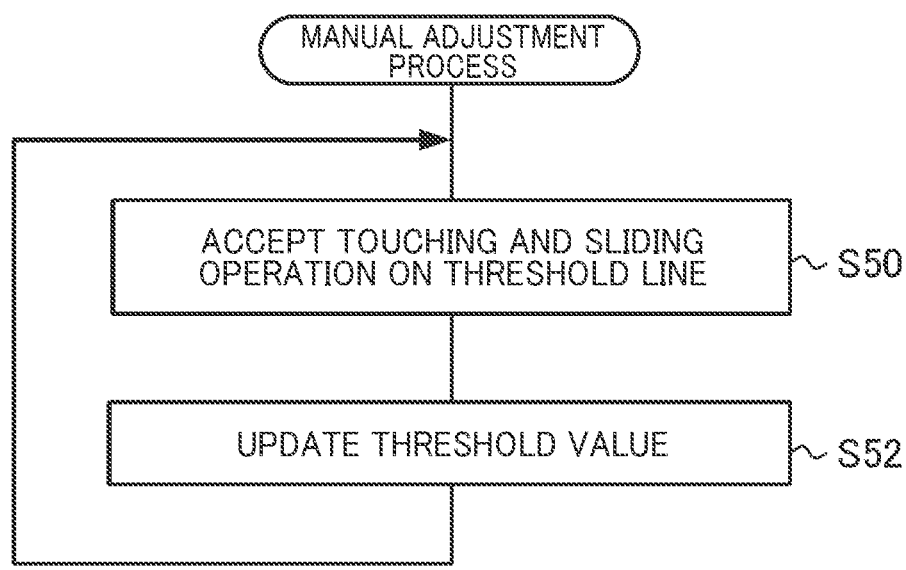
FIG. 14 is a flowchart for explaining a manual adjustment process.

FIG. 14 is a flowchart for explaining the manual adjustment process.

The accepting unit 106 accepts an operation of touching and sliding the threshold line 202 displayed on the indicator graph screen (S50). The adjusting unit 108 specifies the threshold value 116 by the slid threshold line 202.

The adjusting unit 108 changes the threshold value 116 stored in the storage unit 110, and the display instruction unit 105 redisplays the threshold line 202 in accordance with the changed threshold value 116 (S52).

Determining that chips do not accumulate sufficiently and the threshold value 116 is too small, the operator increases the threshold value 116. Conversely, determining that too many chips have accumulated and the threshold value 116 is too large, the operator decreases the threshold value 116. In this manner, manual adjustment is made to appropriately set the threshold value 116.

Next, the automatic adjustment process of the threshold value will be described. In the automatic adjustment processing, the threshold value 116 is automatically adjusted so as not to discharge the fluid more than necessary and not to neglect the discharge of the fluid. Specifically, the adjustment is conducted so that the amount of chips remaining after fluid discharge will not be excessively small or large. In the case where machining produces a chip shape and size that are easy to remove, it is easy to remove the chips even if there are many chips. Therefore, it is preferable to increase the threshold value 116 so as to wait until the chips have accumulated to some extent before removing them. On the contrary, in the case where machining produces a chip shape and size that are hard to remove, it is preferable to decrease the threshold value 116 so as to remove chips while they are not so many. The automatic adjustment process can be adapted to such chip forms.

In the automatic adjustment process described below, the threshold value 116 is adjusted so that the indicator for the whole substance removal area indicating the accumulation state after fluid discharge will be included in an appropriate range. As described below with reference to FIG. 15, the threshold value 116 is decreased when the indicator for the whole substance removal area after fluid discharge is above an appropriate range 203. On the contrary, as will be described later with reference to FIG. 16, the threshold value 116 is increased when the indicator for the whole substance removal area after fluid discharge is below the appropriate range 203. When the indicator for the whole substance removal area after fluid discharge is within the appropriate range 203, the threshold value 116 is maintained. In this manner, fluid discharge is performed at an appropriate timing according to the conditions of generation and removal of chips.

Figure 15:
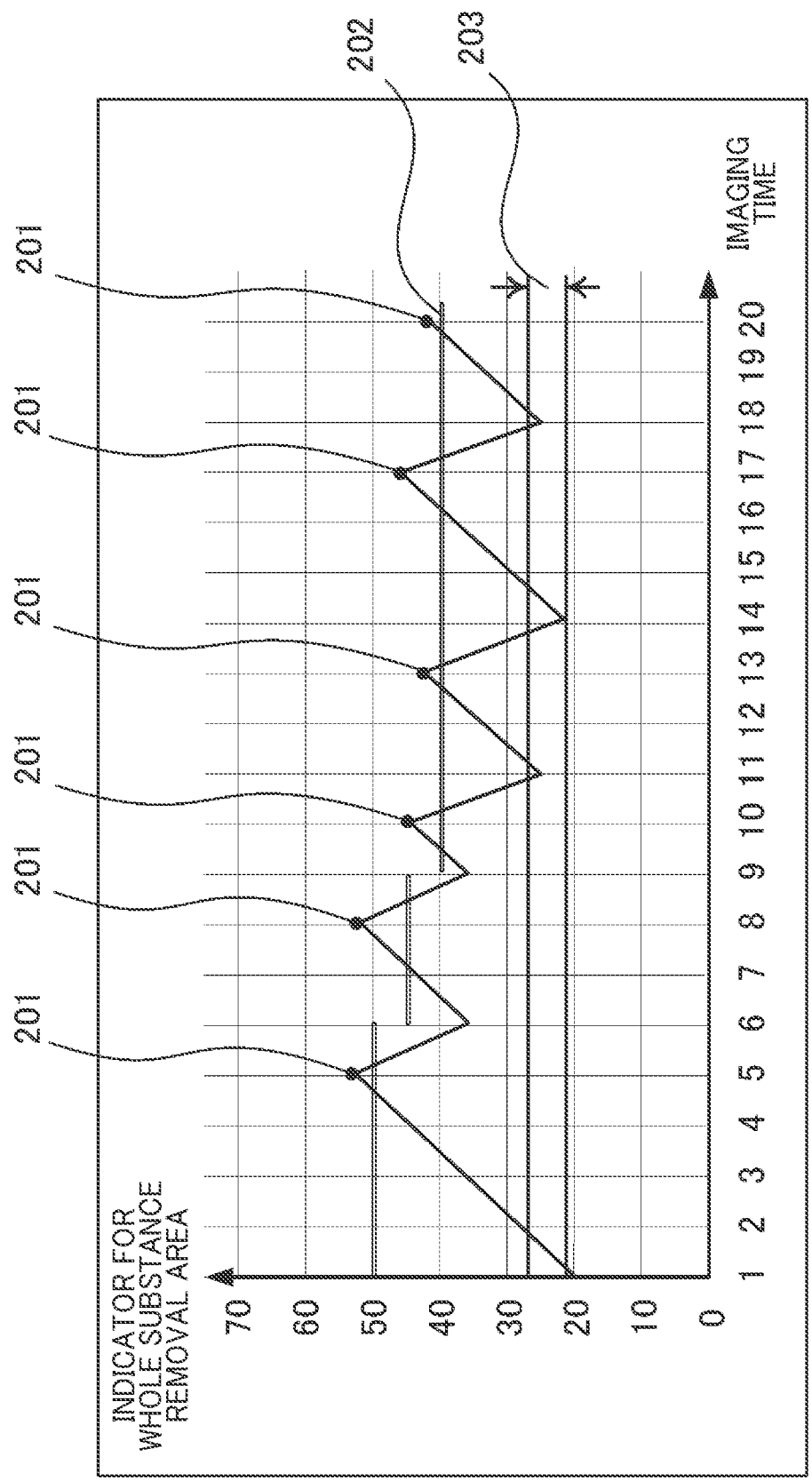
FIG. 15 is a diagram illustrating an example of automatic adjustment of the threshold value.

FIG. 15 is a diagram illustrating an example of the automatic adjustment started when the threshold value 116 is "50".

The threshold value 116 of "50" is too high, and is reduced to "40" by automatic adjustment, as shown. In this example, it is assumed that the appropriate range 203 of the indicator for the whole substance removal area after fluid discharge is "22" to "27". In other words, if the condition of the chips remaining after the fluid discharge corresponds to the indicator "22" to "27" of the whole substance removal area, it means that the fluid discharge timing was appropriate. On the contrary, if the indicator for the whole substance removal area exceeds "27", it means that the fluid discharge timing is too late and there remain many chips which could not be removed. This is because the threshold value 116 is too high and the fluid discharge timing is too late.

The control of the automatic adjustment shown in FIG. 15 will be described in detail.

Although the indicator for the whole substance removal area increases from the first time to the fourth time, liquid discharge is not performed because the indicator does not exceed "50" of the threshold value 116. At the fifth time, the indicator for the whole substance removal area exceeds the threshold value 116 of "50" and fluid discharge is performed, and then, at the sixth time after the fluid discharge, the indicator for the whole substance removal area is reduced. However, the indicator for the whole substance removal area after fluid discharge (at the sixth time) is larger than the upper limit "27" of the appropriate range 203. This means that the chips cannot be sufficiently removed even if the liquid discharge is performed. In this case, the threshold value 116 of "50" is determined to be too large and the threshold value 116 is decreased to "45". Thereafter, at the seventh time and at the eighth time, the indicator for the whole substance removal area increases, and the indicator for the whole substance removal area at the eighth time exceeds the threshold value 116 of "45", and fluid discharge is performed. The indicator for the whole substance removal area after fluid discharge (at the ninth time) is still larger than the upper limit "27" of the appropriate range 203. Then, it is determined that the fluid discharge is not sufficient yet, the threshold value 116 is further lowered to "40". At the 10th time, the indicator for the whole substance removal area increases to exceed the threshold value 116 of "40", and fluid discharge is performed. Since the indicator for the whole substance removal area after fluid discharge (at 11th time) falls within the appropriate range 203, the threshold value 116 of "40" is maintained. Thereafter, fluid discharge is performed at the 13th time and at the 17th time where the indicator for the whole substance removal area exceeds the threshold value 116 of "40", and since both of the indicators for the whole substance removal area after fluid discharge (at the 14th time and the 18th time) fall within the appropriate range 203, the threshold value 116 of "40" is maintained. In this way, "50" of the too-high threshold value 116 is corrected to an appropriate value of "40". After the threshold value 116 is set to "40", the situation where the chips cannot be completely removed is improved, and the frequency of fluid discharge is maintained at low and stable level.

Figure 16:
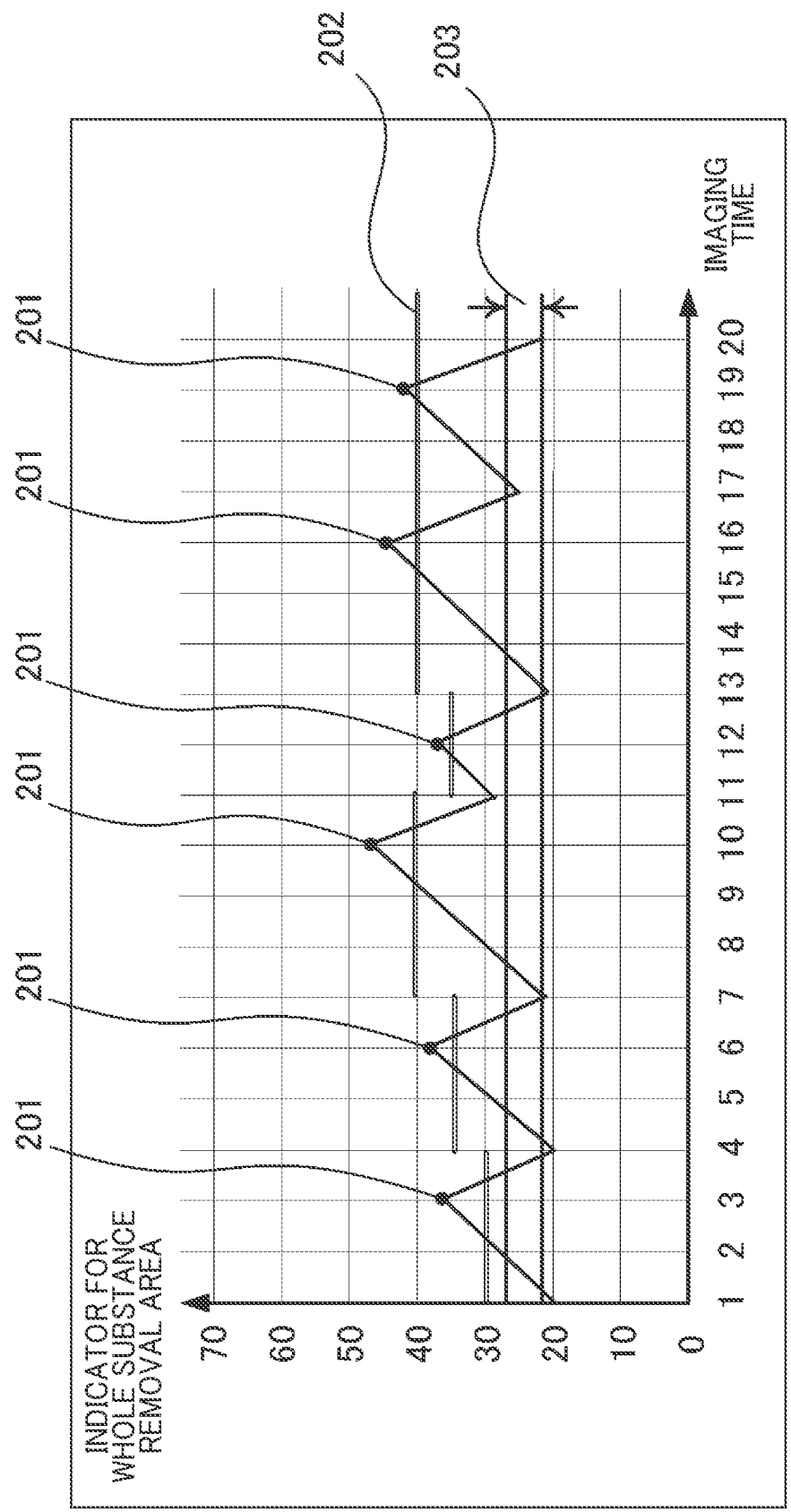
FIG. 16 is a diagram illustrating an example of automatic adjustment of the threshold value.

FIG. 16 is a diagram illustrating an example of the automatic adjustment started when the threshold value 116 is "30".

The threshold value 116 of "30" is too low, and is increased to "40" by automatic adjustment, as shown. As in the case of FIG. 15, it is assumed that the appropriate range 203 of the indicator for the whole substance removal area after fluid discharge is "22" to "27". If the indicator for the whole substance removal area is below "22", it means that fluid is being discharged before chips accumulate. This is because the threshold value 116 is too low and the fluid discharge timing is too early.

The control of the automatic adjustment shown in FIG. 16 will be described in detail.

The indicator for the whole substance removal area increases from the first time to the third time, and the indicator for the whole substance removal area exceeds "30" of the threshold value 116 at the third time. This results in fluid discharge, but the indicator for the whole substance removal area at the fourth time which is after fluid discharge is less than the lower limit "22" of the appropriate range 203. This means excessive cleaning. In this case, the threshold value 116 of "30" is determined to be too small and the threshold value 116 is increased to "35". Thereafter, at the fifth time and the sixth time, the indicator for the whole substance removal area increases, and the indicator for the whole substance removal area at the sixth time exceeds the threshold value 116 of "35", and fluid discharge is performed. The indicator for the whole substance removal area after fluid discharge (at the seventh time) is also less than the lower limit "22" of the appropriate range 203. Then, it is determined that excessive cleaning is still being performed, so that the threshold value 116 is further increased to "40". Thereafter, the threshold value 116 temporarily falls to "35" at the 11th time, but returns to "40" again at the 13th time. Thereafter, the indicators for the whole substance removal area after fluid discharge (at the 17th time and at the 20th time) are within the appropriate range 203. Thus, the threshold value 116 of "40" is maintained. In this manner, the too-low threshold value 116 of "30" is corrected to an appropriate value of "40". After the threshold value 116 is set to "40", the number of times of excessively performed fluid discharging is reduced.

Figure 17:
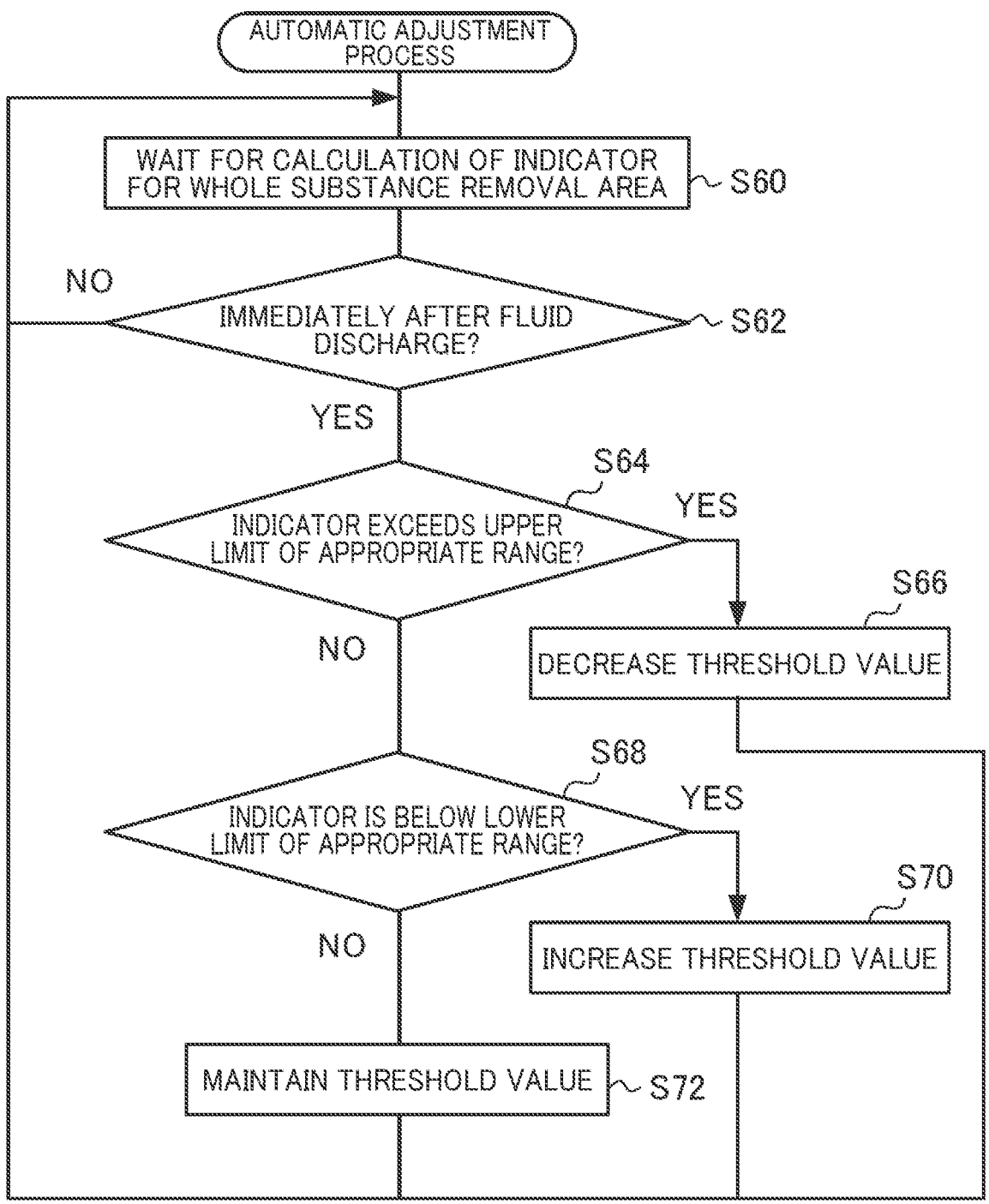
FIG. 17 is a flowchart for explaining an automatic adjustment process.

FIG. 17 is a flowchart for explaining the automatic adjustment process.

Figure 10:
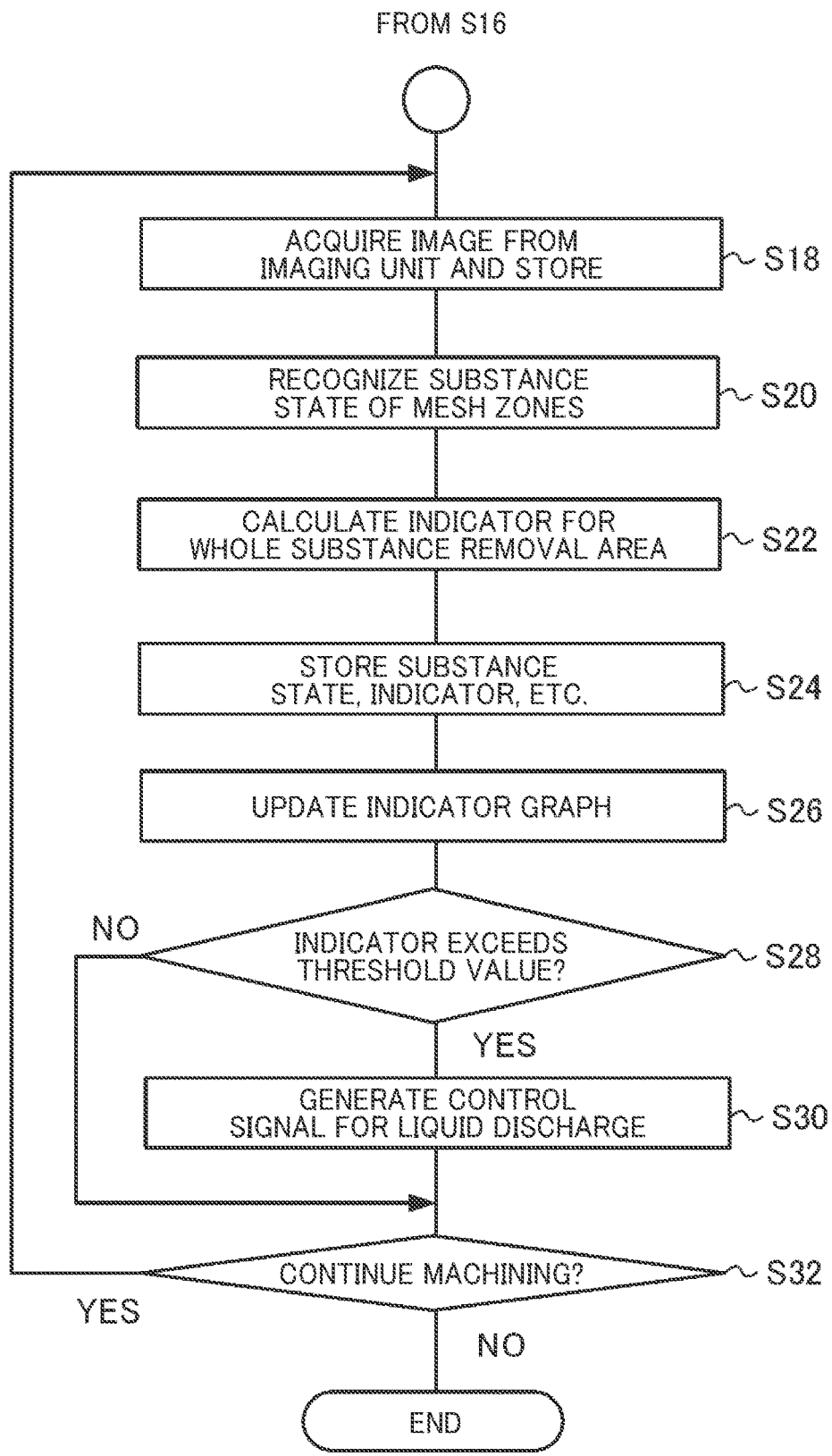
FIG. 10 is a flowchart for explaining a liquid discharge process.

The automatic adjustment process is executed in parallel with the liquid discharge process shown in FIG. 10. When the indicator for the whole substance removal area shown in S22 of FIG. 10 is calculated (S60), the adjusting unit 108 determines whether or not it corresponds to the time immediately after fluid discharge (S62). That is, the adjusting unit 108 determines whether or not fluid discharge has been performed immediately before. If this is not the case of immediately after fluid discharge (S62: NO), the next calculation of the indicator for the whole substance removal area is waited while maintaining the threshold value 116 (S60).

On the other hand, when it corresponds to the time immediately after the fluid discharge (S62: YES), the adjusting unit 108 determines whether or not the indicator for the whole substance removal area exceeds the upper limit of the appropriate range 203 (S64). The upper limit of the appropriate range 203 is set in advance.

If the indicator for the whole substance removal area exceeds the upper limit of the appropriate range 203 (S64: YES), the adjusting unit 108 decreases the threshold value 116 (S66). The adjusting unit 108 subtracts a certain number (e.g., five) from the threshold value 116. Alternatively, the adjusting unit 108 may multiply the threshold value 116 by a value smaller than 1 (e.g., 0.9). The display instruction unit 105 redisplays the threshold line 202 in accordance with the changed threshold value 116.

On the other hand, if the indicator for the whole substance removal area does not exceed the upper limit of the appropriate range 203 (S64: NO), the adjusting unit 108 determines whether or not the indicator for the whole substance removal area is less than the lower limit of the appropriate range 203 (S68). The lower limit of the appropriate range 203 is set in advance.

If the indicator for the whole substance removal area is less than the lower limit of the appropriate range 203 (S68: YES), the adjusting unit 108 increases the threshold value 116 (step 70). The adjusting unit 108 adds a certain number (e.g., five) to the threshold value 116. Alternatively, the adjusting unit 108 may multiply the threshold value 116 by a value greater than 1 (e.g., 1.1). The display instruction unit 105 redisplays the threshold line 202 in accordance with the changed threshold value 116.

On the other hand, if the indicator for the whole substance removal area reaches the lower limit of the appropriate range 203 (S68: YES), i.e., when the indicator for the whole substance removal area falls within the appropriate range 203, the adjusting unit 108 maintains the threshold value 116 (S72). Then, the process returns to S60 and waits for the calculation of the next indicator for the whole substance removal area.

Modifications

In the embodiment, the pallet 14 is exemplified as the substance removal area, but the substance removal area is not limited to the pallet 14. Other portions may be treated as substance removal areas. For example, the cover 15, the table 16, the side surface 18, the slope 19, and the like may be the substance removal area.

A plurality of substance removal areas may be set. That is, the accepting unit 106 may accept the selection of one or more mesh zones for each of the plurality of substance removal areas. The substance recognition unit 104 may recognize the substance state in the mesh zones selected for each substance removal area. Further, the control unit 107 may generate a control signal for the liquid discharge unit 11 for each substance removal area on the basis of a comparison result between an indicator based on the substance state recognized for each substance removal area and a threshold value for each substance removal area.

Figure 18:
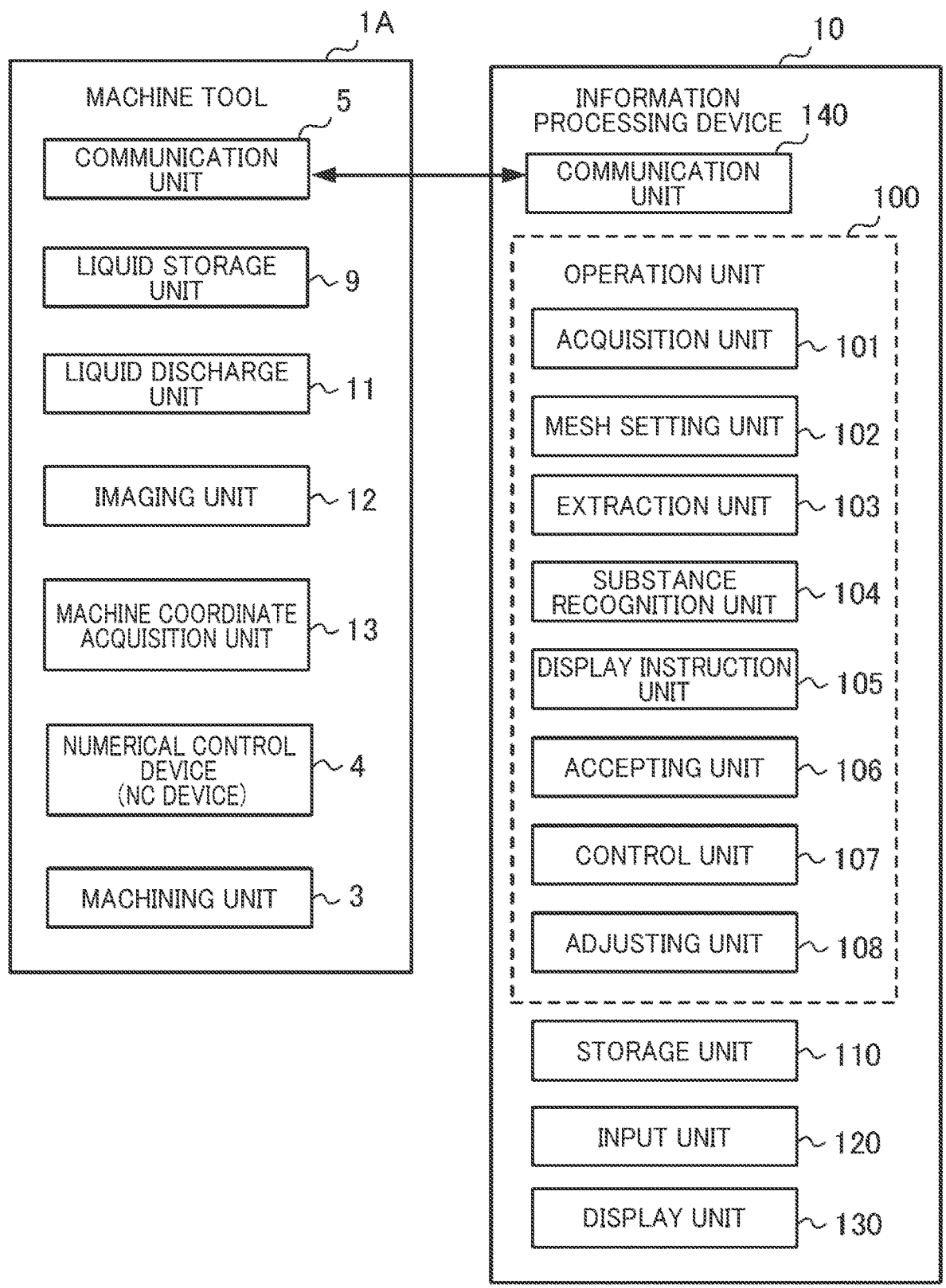
FIG. 18 is a block diagram illustrating a configuration of a machine tool and an information processing device according to a modified example.

In the above description, the information processing device 10 is included in the machine tool 1, but the present invention is not limited thereto. Specifically, as shown in FIG. 18, the information processing device 10 may be an external information processing terminal which is not included in a machine tool 1A, independent from the machine tool 1A, and capable of data communication with the machine tool 1A. Although the detailed description of FIG. 18 is omitted, the configuration of the machine tool 1A is the same as that of the machine tool 1 described above with reference to FIGS. 1 and 2 except that the machine tool 1A includes the communication unit 5 and the information processing device 10 is not included therein.

In the above description, various screens are displayed on the display unit 130 of the information processing device 10, but the present invention is not limited thereto. Specifically, the display unit 130 for displaying various screens may be a display of an external information processing terminal or the like which is not included in the machine tool 1 and the information processing device 10, and capable of data communication with the information processing device 10. Further, the accepting unit 106 may accept user operations by using an input unit such as an external information processing terminal capable of data communication with the information processing device 10.

The fluid discharge described above is an example of cleaning. In addition to fluid discharge, the substance may be removed by gas-spraying or brushing.

Figure 19:
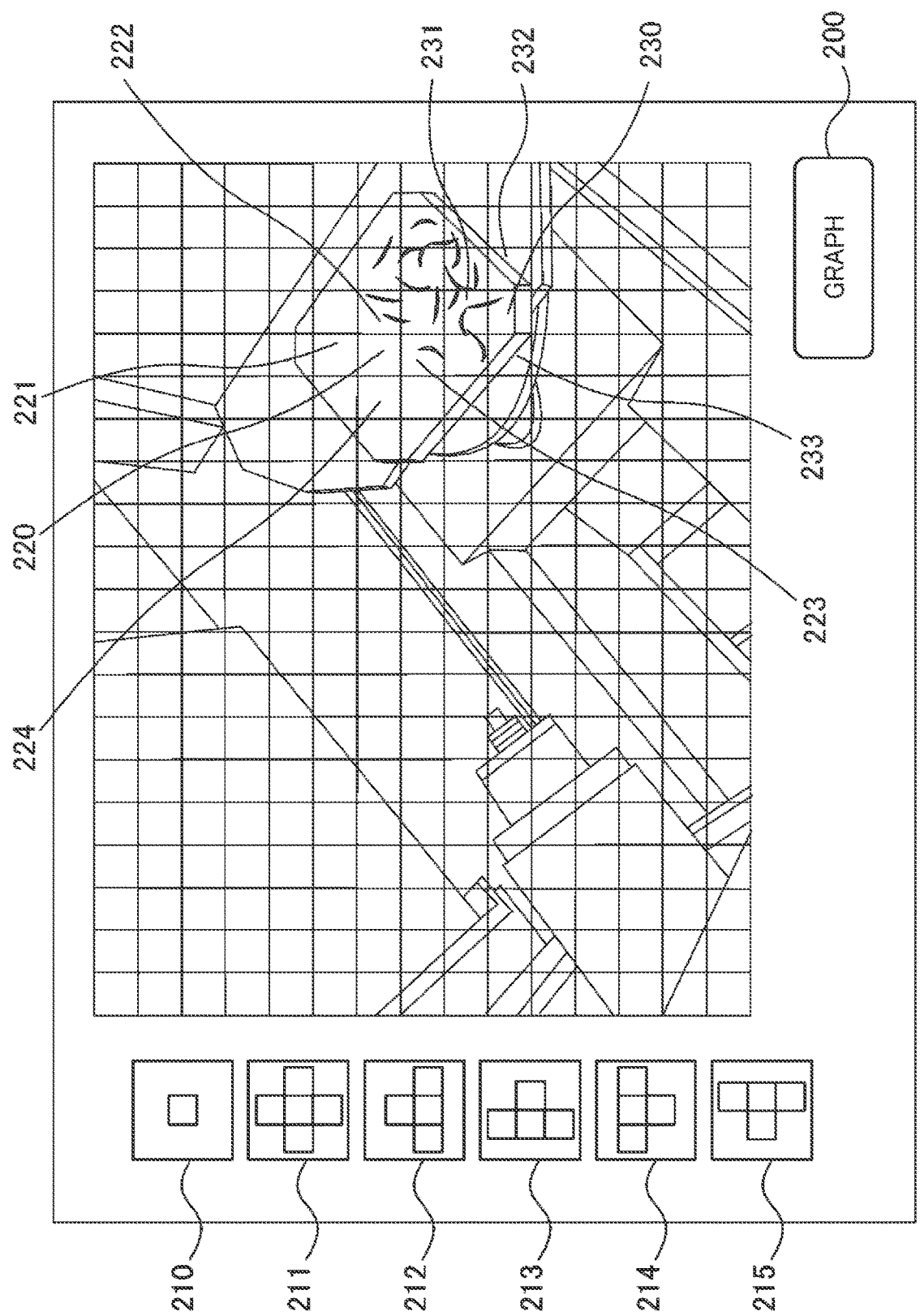
FIG. 19 is an example of a main screen according to a modified example.

FIG. 19 illustrates an example of a main screen according to a modified example. A user selects the mesh zones according to shapes in the machine tool 1. That is, the user selects the mesh zones covering the substance removal area (e.g., the pallet 14) while viewing the captured image on the main screen. Specifically, the user touches each mesh zone that includes at least a portion of the substance removal area. By selecting a button 210 for selecting one mesh zone and then touching a mesh zone, only the touched mesh zone is selected.

By selecting a button 211 for selecting five mesh zones of the cross shape and then touching a mesh zone, the touched mesh zone (referred to as the "first selected mesh zone") and four mesh zones adjacent to the first selected mesh zone (referred to as the "four selected mesh zones") are collectively selected. The four selected mesh zones are a mesh zone adjacent to the upper side of the first selected mesh zone, a mesh zone adjacent to the right side of the first selected mesh zone, a mesh zone adjacent to the lower side of the first selected mesh zone, and a mesh zone adjacent to the left side of the first selected mesh zone. In the example shown, when the user selects the button 211 and then touches the mesh zones 220, the mesh zone 220 is selected as the first selected mesh zone, and the mesh zone 221, mesh zone 222, mesh zone 223, and mesh zone 224 are also automatically selected as the four selected mesh zones.

Further, by selecting a button 212 for selecting four mesh zones of a 180-degree-rotated-T shape and then touching a mesh zone, the touched mesh zone (referred to as the "second selected mesh zone") and three mesh zones adjacent to the second selected mesh zone (referred to as the "three selected mesh zones") are collectively selected. The three selected mesh zones are a mesh zone adjacent to the upper side of the second selected mesh zone, a mesh zone adjacent to the right side of the second selected mesh zone, and a mesh zone adjacent to the left side of the second selected mesh zone. In the example shown, when the user selects the button 212 and then touches the mesh zone 230, the mesh zone 230 is selected as the second selected mesh zone, and the mesh zone 231, mesh zone 232, and mesh zone 233 are also automatically selected as the three selected mesh zones.

Similarly, by selecting a button 213 for selecting four mesh zones of a counterclockwise-90-degree-rotated-T shape and then toughing a mesh zone, the touched mesh zone and the mesh zones adjacent to the upper side, right side, and lower side are collectively selected. By selecting a button 214 for selecting four mesh zones of a T shape and then touching a mesh zone, the touched mesh zone and the mesh zones adjacent to the right side, lower side, and left side are collectively selected. By selecting a button 215 for selecting four mesh zones of a clockwise-90-degree-rotated-T shape and then toughing a mesh zone, the touched mesh zone and the mesh zones adjacent to the upper side, left side, and lower side are collectively selected. In this way, the process of accepting the selection of the substance removal area including the plurality of mesh zones is executed by the accepting unit 106. Enabling the collective selection of five or four mesh zones as describe above will improve operation efficiency.

The embodiments and the modifications have been described as examples of the techniques disclosed in the present application. However, the technique in the present disclosure is not limited to these, and can be applied to embodiments in which changes, substitutions, additions, and omissions, among others are made as appropriate.

Information processing devices, machine tools, and information processing systems described in all claims of the present disclosure are implemented by cooperating with hardware resources, such as processors, memories, and programs.

The information processing device, machine tool, and information processing system of the present disclosure are useful, e.g., for cleaning machine tools.

CROSS REFERENCE TO RELATED APPLICATIONS

This application is a continuation application of International Application No. PCT/JP2021/029129, filed on Aug. 5, 2021, which claims priority to and the benefit of Japanese Patent Application No. 2020-133506, filed on Aug. 6, 2020. The contents of these applications are incorporated herein by reference in their entirety.

What is claimed is:
1. An information processing device comprising:
a processor,
wherein the processor includes:
a mesh setting unit that sets a plurality of mesh zones in a captured image including a scattering range of a substance scattered during machining by a machine tool;

an accepting unit that accepts, as an area formed by selecting the mesh zones according to shapes in the machine tool, a selection of an area including (i) a selected first selected mesh zone, (ii) four selected mesh zones adjacent to the selected first selected mesh zone, (iii) a selected second selected mesh zone, and (iv) three selected mesh zones adjacent to the selected second selected mesh zone;

a substance recognition unit that recognizes a substance state in the whole of the plurality of mesh zones included in the area with respect to the captured image; and a display instruction unit that instructs a display unit to display indicators based on the substance state recognized in the whole of the plurality of mesh zones included in the area in time series.

2. The information processing device according to claim 1, wherein the processor further includes a control unit that generates a control signal for instructing cleaning of the area on the basis of a comparison result of the indicator and a threshold value.

3. The information processing device according to claim 1,
wherein the display instruction unit instructs the display unit to display, on a graph screen display representing the indicators for each imaging in a time series, a level of the threshold value corresponding to the indicators,
the processor further includes an adjusting unit that modifies the threshold value in response to an operation of changing the level on the graph screen display.

4. The information processing device according to claim 2, wherein the processor further includes an adjusting unit that modifies the threshold value when the indicator after the cleaning is determined to be out of an appropriate range.

5. The information processing device according to claim 2,
wherein the accepting unit accepts the selection of the one or more mesh zones for each of a plurality of areas,
wherein the substance recognition unit recognizes the substance state in the entirety of the plurality of mesh zones included in each area, and wherein the control unit generates the control signal for each of the areas on the basis of a comparison result between an indicator based on the substance state recognized for each of the areas and a threshold value for each of the areas.

6. The information processing device according to claim 1,
wherein the machine tool is provided with: an imaging unit that captures the captured image; a liquid discharge unit that discharges a liquid for moving the substance; a machining unit that performs machining in a machining chamber; and a numerical control unit that controls the liquid discharge unit and the machining unit, and
wherein the information processing device is provided with a transmitting unit that transmits a control signal for instructing cleaning to the numerical control unit.

7. A machine tool comprising:
the information processing device according to claim 1; and
a machining unit that performs machining in a machining chamber.

8. A non-transitory computer readable medium storing computer program that, when executed by a processor of an information processing device, cause the information processing device to perform operations comprising:
setting a plurality of mesh zones in a captured image including a scattering range of a substance scattered during machining by a machine tool;
accepting a selection of an area formed by selecting mesh zones according to shapes in the machine tool, a selection of an area including (i) a selected first selected mesh zone; (ii) four selected mesh zones adjacent to the selected first selected mesh zone; (iii) a selected second selected mesh zone; and (iv) three selected mesh zones adjacent to the selected second selected mesh zone;
recognizing a substance state in the whole of the plurality of mesh zones included in the area with respect to the captured image; and
instructing a display to display indicators based on the substance state recognized in the whole of the plurality of mesh zones included in the area in time series.

* * * * *